United States Patent
Saito

(10) Patent No.: US 6,597,519 B2
(45) Date of Patent: Jul. 22, 2003

(54) OBJECTIVE LENS, OPTICAL PICK-UP APPARATUS AND OPTICAL INFORMATION RECORDING REPRODUCING APPARATUS

(75) Inventor: Shinichiro Saito, Hachioji (JP)

(73) Assignee: Konica Corporation, Tokyo (JP)

( * ) Notice: Subject to any disclaimer, the term of this patent is extended or adjusted under 35 U.S.C. 154(b) by 0 days.

(21) Appl. No.: 10/125,408

(22) Filed: Apr. 19, 2002

(65) Prior Publication Data

US 2003/0021039 A1 Jan. 30, 2003

(30) Foreign Application Priority Data

Apr. 26, 2001 (JP) .................... 2001-129050

(51) Int. Cl.⁷ ............... G02B 3/02; G11B 7/00
(52) U.S. Cl. ............... 359/719; 369/112.03
(58) Field of Search ............... 359/642, 719, 359/708; 369/112.01, 112.23

(56) References Cited

U.S. PATENT DOCUMENTS 5,883,747 A * 3/1999 Yamazaki et al. .......... 359/719
6,498,689 B2 * 12/2002 Katsuma .................... 359/719

* cited by examiner

*Primary Examiner*—Scott J. Sugarman
*Assistant Examiner*—Darryl J. Collins
(74) *Attorney, Agent, or Firm*—Finnegan, Henderson, Farabow, Garrett & Dunner, L.L.P.

(57) ABSTRACT

An objective lens is used in an optical pickup apparatus. The objective lens is a single lens and satisfies the following formulas:

$0.1 < f < 1$ $0.50 < NA < 0.90$ $350 \text{ nm} < \lambda < 850 \text{ nm}$ $1/10 < |m| < 1/3$ the objective lens satisfying the following formula:

$0.0 \lambda\text{rms} < \delta W\text{temp} + \delta W\text{height} < 0.07 \lambda\text{rms}$ where $\delta W\text{temp}$ represents an aberration of the objective lens when an ambient temperature of the optical pickup apparatus is changed from a room temperature by 30° C. and $\delta W\text{height}$ represents an aberration of the objective lens at an image height Y of 0.02 mm.

72 Claims, 7 Drawing Sheets

OBJECTIVE LENS, OPTICAL PICK-UP APPARATUS AND OPTICAL INFORMATION RECORDING REPRODUCING APPARATUS

BACKGROUND OF THE INVENTION

The present invention relates to an objective lens which is used for an optical pick-up apparatus, optical pick-up apparatus and optical information recording reproducing apparatus, and particularly to, by using an objective lens which is an single lens at the definite magnification, an objective lens of the optical pick-up apparatus by which recording and/or reproducing of the optical information recording medium can be conducted, optical pick-up apparatus, and optical information recording reproducing apparatus.

To the optical information recording medium such as a DVD, an optical pick-up apparatus by which the information can be recorded at high density, or reproduced, is developed, and used in various purpose of uses. In such the optical pick-up apparatus, there are various requirements such as the compactness of structure, or the reliability at the time of the environmental temperature change.

In this connection, in the optical pick-up apparatus, as the objective lens by which the information recording light is light converged onto the information recording surface of the optical information recording medium, a material in which the plastic material is a raw material, is used for many cases, because it is advantageous for the mass production. However, in the temperature change of the refractive index, it is well known that the plastic material is about 2 digits larger than the glass material.

Herein, when the environmental temperature of the optical pick-up apparatus having the objective lens formed of the plastic material is increased, and the refractive index of the objective lens is changed, it is well known that the spherical aberration is deteriorated, as the light converging optical system. For example, in the present DVD optical pick-up apparatus, an objective lens of a plastic lens material of the numeral aperture NA is 0.60, and the image formation magnification m=0 is widely spread, however, even when the objective lens is designed so that it becomes no aberration at the focal distance is 3 mm, and the temperature change of the refractive index of the plastic material is dn/dT=−0.00012 (/° C.), and the refractive index of the plastic material at the wavelength of the light source λ=650 nm, is n=1.53, when the temperature of the optical pick-up apparatus is increased by 30° C. from the room temperature, the refractive index of the objective lens is 1.5264, thereby, the residual aberration of 0.033 λrms is generated in the calculation.

Generally, it is said to be necessary that it is suppressed lower than the diffraction limit of the optics (Marèchal's criterion 0.07 arms) in the whole optical system, and because, other than the objective lens, there are various factors to generate the aberration, it is said to be initially important that the aberration generated by the environmental temperature change is suppressed as small as possible.

The spherical aberration deterioration $\delta SA/\delta T$ when the refractive index is changed by the environmental temperature change, is expressed by the following expression, $$\delta SA/\delta T f(1-m)^4 NA^4 \cdot (dn/dT)/\lambda. \qquad (1)$$

Where, the focal distance at the infinity object of the objective lens is f, the numerical aperture on the optical information recording medium side is NA, the wavelength of the light source is λ, the changed amount of the refractive index of the objective lens at the time of the increase of temperature 1° C. is dn/dT, and the image formation magnification is m.

In the optical pick-up apparatus to conduct the recording or reproducing of the information onto the high density optical information recording medium such as the recent DVD, there is a tendency that the numerical aperture NA is further increased. Further, in order to secure the compactness of the optical pick-up apparatus, a trial that it is used at the definite magnification and the definite degree is increased, is conducted. On the other hand, according to the expression (1), the more the numerical aperture NA of the objective lens is increased, or for the very objective lens used in the specification in which the definite degree of the optical system is the more increased, it can be understood that the spherical aberration deterioration becomes conspicuous. For example, as described above, at f=3 mm, m=0, when the numerical aperture is increased from 0.60 to 0.85, the aberration is deteriorated in proportional to 4-th power of NA, and the approximation value of the spherical aberration at the time of 30° C. temperature rise from the room temperature (for example, 25° C.) is 0.12 λrms, and it is presumed that it largely exceeds Marèchal's criterion. Further, when the light source such as the blue laser developed recently is used, the further high densification of the information can be expected, however, the light source wavelength λ is more reduced to the short wavelength thereby, it can be said that the problem of the spherical aberration deterioration to the temperature change is increased to the more severe direction.

To such the problem, from the expression (1) in the same manner, it can be seen that, when the focal distance f is reduced, the spherical aberration deterioration to the temperature change can be suppressed a certain degree. For example, even when the numerical aperture is increased from NA 0.60 to NA 0.85, when the focal distance is decreased to ¼, the same temperature characteristic as before the numerical aperture increase can be obtained.

However, when the focal distance f is reduced, the image height characteristic becomes disadvantageous. This is because, when the obtaining of the same image height is tried, the incident angle onto the objective lens is increased. The more the incident angle is increased, the more the astigmatism or coma is deteriorated. Accordingly, in the image height characteristic, it is preferable that the focal distance is larger.

SUMMARY OF THE INVENTION

In view of the above problems, the present invention is attained, and the object of the present invention is, even in the optical pick-up apparatus in which the numerical aperture NA is increased, or the light source wavelength is reduced, to provide an objective lens which is an objective lens of a single lens having the good temperature characteristic and by which the whole of the optical system which is well-balanced with the image height characteristic can be made compact, optical pick-up apparatus by using it, and optical information recording reproducing apparatus.

The above object of the invention can be attained by the following structures.

An objective lens for an optical pick-up apparatus described in (1), which has the light source of the wavelength λ, and objective lens to conduct the recording and/or reproducing of the information by image forming a luminous flux from the light source onto the optical information recording medium, the objective lens for an optical pick-up apparatus is characterized in that: the objective lens is a single lens, and the focal distance f at the infinite object of the objective lens, numerical aperture NA on the optical information recording medium side, wavelength λ of the light source, changed amount dn/dT of the objective lens refractive index at the time of 1° C. increase of the temperature, and image formation magnification m respectively satisfy the following expressions, $$0.1 < f < 1 \tag{1}$$

$$0.50 < NA < 0.90 \tag{2}$$

$$350 \text{ nm} < \lambda < 850 \text{ nm} \tag{3}$$

$$1/10 < |m| < 1/3 \tag{4}$$

$$0.0 < ((1-m)NA)^4 \times f \times |dn/dT|/\lambda < 0.2 \tag{5}$$

and when the aberration of the objective lens when the temperature of whole the optical pick-up apparatus is increased from the room temperature (for example, 25° C.) by 30° C., is δWtemp, and the aberration at the image height of the objective lens Y=0.02 mm is δWheight, it is that $$0.0 \lambda\text{rms} < \delta W\text{temp} + \delta W\text{height} < 0.07 \lambda\text{rms} \tag{6}$$

According to an objective lens described in (1), the focal distance f is reduced corresponding to the increase of the numerical aperture NA, and the reduction to the short wavelength of the light source wavelength λ, the deterioration of the spherical aberration to the temperature change can be suppressed, however, when the focal distance f is too reduced, because the image height characteristic is deteriorated, when each value is determined within the range satisfying (1)–(6) expressions, an objective lens which is well-balanced with the temperature characteristic and image height characteristic, can be provided. Further, even when it is the high numerical aperture NA, it can be made the definite magnification, thereby it can also be made an optical pick-up apparatus structured compactly and simply in which the luminous flux from the light source is light-converged by using a single objective lens onto the information recording surface of the optical information recording medium.

According to an objective lens for an optical pick-up apparatus described in (2), when the objective lens is structured by the plastic material, because such the plastic material is lighter than the glass material, the increase of the speed of the focusing operation to move the objective lens in the optical axis direction can be attained. Further, because the plastic material is easy for injection molding, the mass production of the objective lens can be conducted with the stable quality.

According to an objective lens for an optical pick-up apparatus described in (3), it is preferable when the objective lens is structured in the both surface aspherical surfaces. Particularly, when the objective lens is structured with the refractive surface, as compared to a case where the objective lens is structured with the diffraction surface, the light amount loss due to the diffraction efficiency is not generated, and it is advantageous in a point in which the transmission light amount is secured.

According to an objective lens for an optical pick-up apparatus described in (4), in the objective lens, which is characterized in that: values of the numerical aperture NA on the optical information recording medium side, wavelength λ of the light source, changed amount dn/dT of the objective lens refractive index at the time of the temperature 1° C. rise, and image formation magnification m, respectively satisfy the following expressions.

$$0.50 < NA < 0.75 \tag{7}$$

$$450 \text{ nm} < \lambda < 850 \text{ nm} \tag{8}$$

$$0.0 < ((1-m)NA)^4 \times f \times |dn/dT|/\lambda < 0.06. \tag{9}$$

When the numerical aperture NA is larger than 0.50, and the light source wavelength λ is not larger than 850 nm, it can cope with the optical information recording medium with a comparatively high density, on the one hand, when the numerical aperture NA is not larger than 0.75, and the light source wavelength λ is larger than 450 nm, the deterioration of the spherical aberration to the temperature change can be suppressed within the range shown by the expression (9).

An objective lens for an optical pick-up apparatus described in (5), is characterized in that the axial thickness d of the objective lens satisfies $$0.4 < d/f < 1.5 \tag{10}.$$

When the value d/f exceeds the lower limit value of the expression (10), in the design work, the control of the image height characteristic becomes easy, and on the one hand, when smaller than the upper limit value, when the objective lens is separated from the optical information recording medium, the enough working distance can be secured.

An objective lens for an optical pick-up apparatus described in (6), is characterized in that: when the paraxial radius of curvature of the surface on the light source side of the objective lens is r1, and the refractive index in the wavelength λ of the objective lens is n, the objective lens satisfies $$0.3 < r1 < (n(1-m)f) < 0.5. \tag{11}$$

The present invention particularly relates to the coma component of the image height characteristic. When the expression (11) is satisfied, the correction of so-called sinusoidal condition, as the condition in which the coma is corrected at the time when the luminous flux is obliquely incident onto the objective lens becomes easy.

As can be seen from the expression (11), in the objective lens, it is said to be preferable in the aberration correction that the paraxial radius of curvature r1 on the light source side is reduced in both convex lens. However, thereby, the change of the prospective angle of the aspherical surface on the light source side becomes large as close to the periphery, and the aspherical surface of the surface on the light source side is a large factor to limit the edge thickness. This will be specifically described below.

FIG. 1 is a sectional view typically showing a portion of the objective lens of the present invention. Herein, conventionally, it is conducted that the both surface aspherical surface shape of the objective lens is extended to a position to be connected to a flange portion of the objective lens. However, as the present invention described in (6), when the paraxial radius of curvature r1 is set smaller so as to satisfy the expression (11), as shown by a doted line in FIG. 1, because the prospective angle θ1 (an angle formed between a tangential line of a intersecting point P3 with the flange portion in the cross section of the aspherical surface on the light source side, and the tangential line of the flange portion at the intersecting point P3) is increased, there is a tendency that the flange thickness t1 is decreased. When the flange thickness t1 is decreased, at the time of molding of the objective lens, the flow of the raw material is badly affected, and there is a problem that the molding trouble is easily generated.

According to the following inventions, such the problem can be eliminated or softened.

An objective lens for an optical pick-up apparatus described in (7) is characterized in that: in a position (herein, P1 shown in FIG. 1) at which the outermost ray (herein, LB1 shown in FIG. 1) of the numerical aperture NA crosses, a linkage area (A shown in FIG. 1) in which the edge thickness of the objective lens is increased, is provided. According to such the invention, the objective lens is a surface shape as shown by the solid line in FIG. 1, and thereby, the prospective angle θ2 is reduced more than the conventional prospective angle θ1, and the flange thickness t2 can be more increased, and the productivity of the objective lens can be increased. In this connection, by optimizing the shape of the linkage portion, when the luminous flux passed the linkage area is converted into a flare light which is not related to the image formation, the diaphragm effect can also be provided.

An objective lens for an optical pick-up apparatus described in (8) is characterized in that: in an outside portion in the intersecting direction to the optical axis of the position (herein, P2 shown in FIG. 1) at which the outermost ray (herein, LB2 shown in FIG. 1) of the numerical aperture NA crosses, a linkage area (A shown in FIG. 1) in which the edge thickness of the objective lens is increased, is provided. Because the luminous flux passing the outside portion in the intersecting direction to the optical axis of the position at which the outermost ray of the numerical aperture NA crosses, is not related to the image formation onto the information recording surface of the optical information recording medium, in the design work, as the invention described in (7), the linkage area may be formed directly toward the outside from the position P1 at which the outermost ray intersects, however, in the practice, due to the accuracy of parts, or assembling error, the position at which the outermost ray passes, varies to the designed position. Therefore, as the present invention, at the outside portion in the intersecting direction to the optical axis of the position (P2) at which the outermost ray (LB2) of the numerical aperture NA crosses, when the linkage area in which the edge thickness of the objective lens is increased is provided, even when the intersecting position is varied, the luminous flux passing the inside of the position at which the outermost ray passes is made always to relate to the image formation, and thereby, the transmitted light amount can be effectively secured.

An objective lens for an optical pick-up apparatus described in (9) is characterized in that: in the linkage area, a step is provided in the optical axis direction FIG. 2 is the same sectional view as FIG. 1, which shows a portion of the objective lens of the present invention. In FIG. 2, at the outside in the optical axis right-angled direction from the position (herein, P1 shown in FIG. 2) at which the outermost ray of the numerical aperture NA (herein, LB1 shown in FIG. 2) crosses, the surface on the light source side of such the objective lens (that is, a linkage area) is the step difference (A' shown in FIG. 2) protruded onto the light source side of the optical axis direction. By conducting as described above, the edge thickness t3 of the objective lens can be secured further largely. In this connection, by optimizing the shape of the step difference, when, for example, the luminous flux which transmits the step difference, is converted into a flare light which is not related to the image formation, the diaphragm effect can also be provided. In this case, the step difference, as shown by a dotted line in FIG. 2, may also be a concave shape to the optical information recording medium side in the optical axis direction.

An objective lens for an optical pick-up apparatus described in (10) is preferable when the difference of the prospective angles of the aspherical shape in the inside and outside in the crossing direction with the optical axis of the linkage area (in FIG. 1, an angle, for example, $(θ_1 - θ_2)$, formed between the tangential line with the surface of the lens in the effective diameter at the point P1, and the tangential line of the linkage area at the point P3) is within 20°. When the prospective angle of the linkage area is too large, it is for the reasons in which it is not preferable that the load onto the top edge portion of the bite becomes too large at the time of the molding working, further, when, at the outside and inside of the linkage area, the molding die is made as the separate members and the objective lens is molded, because the fins are produced in the lens surface, it is not preferable.

An optical pick-up apparatus described in (11) in which it has the light source of the wavelength λ and an objective lens by which, by image forming the luminous flux from the light source onto the optical information recording medium, the information is recorded and/or reproduced, the optical pick-up apparatus is characterized in that: the objective lens is a single lens, and values of the focal distance f at the infinite object of the objective lens, numerical aperture NA of the optical information recording medium side, the wavelength λ of the light source, changed amount dn/dT of the objective lens refractive index at the time of the temperature 1° C. rise, and image formation magnification m, respectively satisfy the following expressions, $$0.1 < f < 1 \quad (1)$$

$$0.50 < NA < 0.90 \quad (2)$$

$$350 \text{ nm} < λ < 850 \text{ nm} \quad (3)$$

$$1/10 < |m| < 1/3 \quad (4)$$

$$0.0 < ((1-m)NA)^4 \times f \times |dn/dT|/λ < 0.2 \quad (5),$$

and when the residual aberration of the objective lens when the temperature of whole the optical pick-up apparatus is increased from the room temperature (for example, 25° C.) by 30° C., is δWtemp, and the residual aberration at the image height of the objective lens Y=0.02 mm is δWheight, $$0.0 λrms < δWtemp + δWheight < 0.07 \text{ λrms} \quad (6).$$

The operational effect of the present invention is the same as the invention described in (1).

An optical pick-up apparatus described in (12) is characterized in that the objective lens is structured by the plastic material. The operational effect of the present invention is the same as the invention described in (2).

An optical pick-up apparatus described in (13) is characterized in that the objective lens is structured by both surface aspherical surfaces. The operational effect of the present invention is the same as the invention described in (3).

An optical pick-up apparatus described in (14) is characterized in that, in the objective lens, values of the numerical aperture NA of the optical information recording medium side, the wavelength λ of the light source, changed amount dn/dT of the objective lens refractive index at the time of the temperature 1° C. rise, and image formation magnification m, respectively satisfy the following expressions, $$0.50 < NA < 0.75 \quad (7)$$

$$450\text{ nm} < \lambda < 850\text{ nm} \quad (8)$$

$$0.0 < ((1-m)NA)^4 \times f \times |dn/dT|/\lambda < 0.06 \quad (9).$$

The operational effect of the present invention is the same as the invention described in (4).

An optical pick-up apparatus described in (15) is characterized in that the axial thickness d of the objective lens satisfies $$0.4 < d/f < 1.5 \quad (10).$$

The operational effect of the present invention is the same as the invention described in (5).

An optical pick-up apparatus described in (16) is characterized in that, when the paraxial radius of curvature of the surface on the light source side of the objective lens is r1, and the refractive index at the wavelength λ of the objective lens is n, it satisfies $$0.3 < r1/(n(1-m)f) < 0.5 \quad (11).$$

The operational effect of the present invention is the same as the invention described in (6).

An optical pick-up apparatus described in (17) is characterized in that the surface of the light source side of the objective lens is provided with, at a position at which the outermost ray of the numerical aperture NA crosses, a linkage area in which the edge thickness of the objective lens is increased. The operational effect of the present invention is the same as the invention described in (7).

An optical pick-up apparatus described in (18) is characterized in that the surface of the light source side of the objective lens is provided with, at the outside portion of the intersecting direction to the optical axis at a position at which the outermost ray of the numerical aperture NA crosses, a linkage area in which the edge thickness of the objective lens is increased. The operational effect of the present invention is the same as the invention described in (8).

An optical pick-up apparatus described in (19) is characterized in that the linkage area is provided with a step difference in the optical axis direction. The operational effect of the present invention is the same as the invention described in (9).

An optical pick-up apparatus described in (20) is characterized in that the difference of the prospective angles of the aspherical surface shape at the inside and outside of the intersecting direction to the optical axis of the linkage area is within 20°. The operational effect of the present invention is the same as the invention described in (10).

An optical information recording reproducing apparatus described in (21) in which it has the light source of the wavelength λ and an objective lens by which, by image forming the luminous flux from the light source onto the optical information recording medium, the information is recorded and/or reproduced, the optical information recording reproducing apparatus is characterized in that: the objective lens is a single lens, and values of the focal distance f at the infinite object of the objective lens, numerical aperture NA of the optical information recording medium side, the wavelength λ of the light source, changed amount dn/dT of the objective lens refractive index at the time of the temperature 1° C. rise, and image formation magnification m, respectively satisfy the following expressions, $$0.1 < f < 1 \quad (1)$$

$$0.50 < NA < 0.90 \quad (2)$$

$$350\text{ nm} < \lambda < 850\text{ nm} \quad (3)$$

$$1/10 < |m| < 1/3 \quad (4)$$

$$0.0 < ((1-m)NA)^4 \times f \times |dn/dT|/\lambda < 0.2 \quad (5),$$

and when the residual aberration of the objective lens when the temperature of whole the optical information recording reproducing apparatus is increased from the room temperature (for example, 25° C.) by 30° C., is δWtemp, and the residual aberration at the image height of the objective lens Y=0.02 mm is δWheight, $$0.0\ \lambda\text{rms} < \delta W\text{temp} + \delta W\text{height} < 0.07\ \lambda\text{rms} \quad (6).$$

The operational effect of the present invention is the same as the invention described in (1).

An optical information recording reproducing apparatus described in (22) is characterized in that the objective lens is structured by the plastic material. The operational effect of the present invention is the same as the invention described in (2).

An optical information recording reproducing apparatus described in (23) is characterized in that the objective lens is structured by the both surface aspherical surfaces. The operational effect of the present invention is the same as the invention described in (3).

An optical information recording reproducing apparatus described in (24) is characterized in that, in the objective lens, values of the numerical aperture NA of the optical information recording medium side, the wavelength λ of the light source, changed amount dn/dT of the objective lens refractive index at the time of the temperature 1° C. rise, and image formation magnification m, respectively satisfy the following expressions.

$$0.50 < NA < 0.75 \quad (7)$$

$$450\text{ nm} < \lambda < 850\text{ nm} \quad (8)$$

$$0.0 < ((1-m)NA)^4 \times f \times |dn/dT|/\lambda < 0.06 \quad (9).$$

The operational effect of the present invention is the same as the invention described in (4).

An optical information recording reproducing apparatus described in (25) is characterized in that the axial thickness d of the objective lens satisfies 0.4<d/f<1.5 (10). The operational effect of the present invention is the same as the invention described in (5).

An optical information recording reproducing apparatus described in (26) is characterized in that, when the paraxial radius of curvature of the surface on the light source side of the objective lens is r1, and the refractive index at the wavelength λ of the objective lens is n, it satisfies $$0.3 < r1/(n(1-m)f) < 0.5 \quad (11).$$

The operational effect of the present invention is the same as the invention described in (6).

An optical information recording reproducing apparatus described in (27) is characterized in that the surface on the light source side of the objective lens, at the position at which the outermost ray of the numerical aperture NA crosses, is provided with a linkage area in which the edge thickness is increased. The operational effect of the present invention is the same as the invention described in (7).

An optical information recording reproducing apparatus described in (28) is characterized in that the surface on the light source side of the objective lens is, at the outside portion in the intersecting direction to the optical axis of the position at which the outermost ray of the numerical aperture NA crosses, provided with the linkage area in which the edge thickness of the objective lens is increased. The operational effect of the present invention is the same as the invention described in (8).

An optical information recording reproducing apparatus described in (29) is characterized in that the linkage area is provided with a step difference in the optical axis direction. The operational effect of the present invention is the same as the invention described in (9).

An optical information recording reproducing apparatus described in (30) is characterized in that the difference of the prospective angles of the aspherical surface shape at the inner side and the outer side in the intersecting direction to the optical axis of the linkage area is within 20°. The operational effect of the present invention is the same as the invention described in (10).

(31) An objective lens for use in an optical pickup apparatus which comprises a light source to emit a light flux having a wavelength $\lambda$ and the objective lens to focus the light flux on an optical information recording medium for conducting recording or reproducing information, comprising:

the objective lens being a single lens and satisfying the following formulas:

$$0.1 < f < 1$$

$$0.70 < NA < 0.90$$

$$350 \text{ nm} < \lambda < 850 \text{ nm}$$

$$-1/5 < m < -1/10$$

$$0.0 < ((1-m)NA)^4 \times f \times |dn/dT|/\lambda < 0.01$$

$$1.2 < d/f < 1.7$$

where f is a focal length for an infinite object, NA is a numerical aperture at an optical information recording medium side, $\lambda$ is a wavelength of a light flux emitted from the light source, dn/dT represents a change in a refractive index when the temperature changes 1° C., m is a magnification and d is an axial thickness; and the objective lens satisfying the following formula:

$$0.0 \; \lambda\text{rms} < \delta W\text{temp} + \delta W\text{height} < 0.07 \; \lambda\text{rms}$$

where $\delta W$temp represents an aberration of the objective lens when an ambient temperature of the optical pickup apparatus is changed from a room temperature by 30° C. and $\delta W$height represents an aberration of the objective lens at an image height Y of 0.002 mm (Y=0.002 mm).

(32) The objective lens of (31), wherein the following formula is satisfied:

$$0.3 < r1/(n(1-m)f) < 0.5$$

where r1 is a paraxial radius of curvature at a light source side and n is a refractive index.

(33) The objective lens of (31), wherein a light source side surface of the objective lens is provided with a joint region to make a thickness of a peripheral portion of the objective lens thicker at a position where an outermost light flux of the numerical aperture NA crosses.

(34) The objective lens of (31), wherein a light source side surface of the objective lens is provided with a joint region to make a thickness of a peripheral portion of the objective lens thicker at an outside in a direction to perpendicular to an optical axis from a position where an outermost light flux of the numerical aperture NA crosses.

(35) The objective lens of (34), wherein a stepped section is provided in a direction of an axial direction at the joint region.

(36) The objective lens of (33), wherein an angle formed by a tangent line tangent to an aspherical surface at an inner end of the joint region and a tangent line tangent to an aspherical surface at an outer end of the joint region is 20° or less.

(37) An optical pickup apparatus, comprising:

a light source to emit a light flux having a wavelength $\lambda$; and an objective lens to focus the light flux on an optical information recording medium for conducting recording or reproducing information;

the objective lens being a single lens and satisfying the following formulas:

$$0.1 < f < 1$$

$$0.70 < NA < 0.90$$

$$350 \text{ nm} < \lambda < 850 \text{ nm}$$

$$-1/5 < m < -1/10$$

$$0.0 < ((1-m)NA)^4 \times f \times |dn/dT|/<0.01$$

$$1.2 < d/f < 1.7$$

where f is a focal length for an infinite object, NA is a numerical aperture at an optical information recording medium side, $\lambda$ is a wavelength of a light flux emitted from the light source, dn/dT represents a change in a refractive index when the temperature changes 1° C., m is a magnification and d is an axial thickness; and the objective lens satisfying the following formula:

$$0.0 \; \lambda\text{rms} < \delta W\text{temp} + \delta W\text{height} < 0.07 \; \lambda\text{rms}$$

where $\delta W$temp represents an aberration of the objective lens when an ambient temperature of the optical pickup apparatus is changed from a room temperature by 30° C. and $\delta W$height represents an aberration of the objective lens at an image height Y of 0.002 mm (Y=0.002 mm).

(38) The optical pickup apparatus of (37), wherein the following formula is satisfied:

$$0.3 < r1/(n(1-m)f) < 0.5$$

where r1 is a paraxial radius of curvature at a light source side and n is a refractive index.

(39) The optical pickup apparatus of (37), wherein a light source side surface of the objective lens is provided with a joint region to make a thickness of a peripheral portion of the objective lens thicker at a position where an outermost light flux of the numerical aperture NA crosses.

(40) The optical pickup apparatus of (37), wherein a light source side surface of the objective lens is provided with a joint region to make a thickness of a peripheral portion of the objective lens thicker at an outside in a direction to perpendicular to an optical axis from a position where an outermost light flux of the numerical aperture NA crosses.

(41) The optical pickup apparatus of (40), wherein a stepped section is provided in a direction of an axial direction at the joint region.

(42) The optical pickup apparatus of (39), wherein an angle formed by a tangent line tangent to an aspherical surface at an inner end of the joint region and a tangent line tangent to an aspherical surface at an outer end of the joint region is 20° or less.

(43) An optical information reproducing and/or reproducing apparatus, comprising:

a light source to emit a light flux having a wavelength λ; and an objective lens to focus the light flux on an optical information recording medium for conducting recording or reproducing information;

the objective lens being a single lens and satisfying the following formulas:

$0.1 < f < 1$ $0.70 < NA < 0.90$ $350 \text{ nm} < \lambda < 850 \text{ nm}$ $-1/5 < m < -1/10$ $0.0 < ((1-m)NA)^4 \times f \times |dn/dT|/\lambda < 0.01$ $1.2 < d/f < 1.7$ where f is a focal length for an infinite object, NA is a numerical aperture at an optical information recording medium side, λ is a wavelength of a light flux emitted from the light source, dn/dT represents a change in a refractive index when the temperature changes 1° C., m is a magnification and d is an axial thickness; and the objective lens satisfying the following formula:

$0.0 \text{ λrms} < \delta W\text{temp} + \delta W\text{height} < 0.07 \text{ λrms}$ where δWtemp represents an aberration of the objective lens when an ambient temperature of the optical pickup apparatus is changed from a room temperature by 30° C. and δWheight represents an aberration of the objective lens at an image height Y of 0.002 mm (Y=0.002 mm).

(44) The optical information reproducing and/or reproducing apparatus of (43), wherein the following formula is satisfied:

$0.3 < r1/(n(1-m)f) < 0.5$ where r1 is a paraxial radius of curvature at a light source side and n is a refractive index.

(45) The optical information reproducing and/or reproducing apparatus of (43), wherein a light source side surface of the objective lens is provided with a joint region to make a thickness of a peripheral portion of the objective lens thicker at a position where an outermost light flux of the numerical aperture NA crosses.

(46) The optical information reproducing and/or reproducing apparatus of (43), wherein a light source side surface of the objective lens is provided with a joint region to make a thickness of a peripheral portion of the objective lens thicker at an outside in a direction to perpendicular to an optical axis from a position where an outermost light flux of the numerical aperture NA crosses.

(47) The optical information reproducing and/or reproducing apparatus of (46), wherein a stepped section is provided in a direction of an axial direction at the joint region.

(48) The optical information reproducing and/or reproducing apparatus of (45), wherein an angle formed by a tangent line tangent to an aspherical surface at an inner end of the joint region and a tangent line tangent to an aspherical surface at an outer end of the joint region is 20° or less.

(49) An objective lens for use in an optical pickup apparatus which comprises a light source to emit a light flux having a wavelength λ and the objective lens to focus the light flux on an optical information recording medium for conducting recording or reproducing information, comprising:

the objective lens being a single lens and satisfying the following formulas:

$0.1 < f < 1$ $0.70 < NA < 0.90$ $350 \text{ nm} < \lambda < 850 \text{ nm}$ $-1/5 < m < -1/10$ $0.01 < ((1-m)NA)^4 \times f \times |dn/dT|/\lambda < 0.11$ $1.2 < d/f < 1.7$ where f is a focal length for an infinite object, NA is a numerical aperture at an optical information recording medium side, λ is a wavelength of a light flux emitted from the light source, dn/dT represents a change in a refractive index when the temperature changes 1° C., m is a magnification and d is an axial thickness; and the objective lens satisfying the following formula:

$0.0 \text{ λrms} < \delta W\text{temp} + \delta W\text{height} < 0.07 \text{ λrms}$ where δWtemp represents an aberration of the objective lens when an ambient temperature of the optical pickup apparatus is changed from a room temperature by 30° C. and δWheight represents an aberration of the objective lens at an image height Y of 0.002 mm (Y=0.002 mm).

(50) The objective lens of (49), wherein the objective lens comprises a diffractive structure to correct a spherical aberration to an under side at a long wavelength side and satisfies the following formula:

$$\Phi = \sum_{i=1}^{\infty} c_i h^{2i} \text{ (mm)}$$

(51) The objective lens of (50), wherein the following formula is satisfied:

$0.08 \leq ((1-m)NA)^4 \times f \times |dn/dT|/\lambda < 0.11$

(52) The objective lens of (49), wherein the following formula is satisfied:

$0.3 < r1/(n(1-m)f) < 0.5$ where r1 is a paraxial radius of curvature at a light source side and n is a refractive index.

(53) The objective lens of (49), wherein a light source side surface of the objective lens is provided with a joint region to make a thickness of a peripheral portion of the objective lens thicker at a position where an outermost light flux of the numerical aperture NA crosses.

(54) The objective lens of (49), wherein a light source side surface of the objective lens is provided with a joint region to make a thickness of a peripheral portion of the objective lens thicker at an outside in a direction to perpendicular to an optical axis from a position where an outermost light flux of the numerical aperture NA crosses.

(55) The objective lens of (54), wherein a stepped section is provided in a direction of an axial direction at the joint region.

(56) The objective lens of (53), wherein an angle formed by a tangent line tangent to an aspherical surface at an inner end of the joint region and a tangent line tangent to an aspherical surface at an outer end of the joint region is 20° or less.

(57) An optical pickup apparatus, comprising:

a light source to emit a light flux having a wavelength $\lambda$; and an objective lens to focus the light flux on an optical information recording medium for conducting recording or reproducing information;

the objective lens being a single lens and satisfying the following formulas:

$0.1 < f < 1$ $0.70 < NA < 0.90$ $350 \text{ nm} < \lambda < 850 \text{ nm}$ $-\frac{1}{5} < m < -\frac{1}{10}$ $0.01 < ((1-m)NA)^4 \times f \times |dn/dT|/\lambda < 0.11$ $1.2 < d/f < 1.7$ where f is a focal length for an infinite object, NA is a numerical aperture at an optical information recording medium side, $\lambda$ is a wavelength of a light flux emitted from the light source, dn/dT represents a change in a refractive index when the temperature changes 1° C., m is a magnification and d is an axial thickness; and the objective lens satisfying the following formula:

$0.0 \text{ } \lambda\text{rms} < \delta W\text{temp} + \delta W\text{height} < 0.07 \text{ } \lambda\text{rms}$ where $\delta W$temp represents an aberration of the objective lens when an ambient temperature of the optical pickup apparatus is changed from a room temperature by 30° C. and $\delta W$height represents an aberration of the objective lens at an image height Y of 0.002 mm (Y=0.002 mm).

(58) The optical pickup apparatus of (57), wherein the objective lens comprises a diffractive structure to correct a spherical aberration to an under side at a long wavelength side and satisfies the following formula:

$$\Phi = \sum_{i=1}^{\infty} c_i h^{2i} \text{ (mm)}$$

(59) The optical pickup apparatus of (58), wherein the following formula is satisfied:

$0.08 < ((1-m)NA)^4 \times f \times |dn/dT|/\lambda < 0.11$

(60) The optical pickup apparatus of (57), wherein the following formula is satisfied:

$0.3 < r1/(n(1-m)f) < 0.5$ where r1 is a paraxial radius of curvature at a light source side and n is a refractive index.

(61) The optical pickup apparatus of (57), wherein a light source side surface of the objective lens is provided with a joint region to make a-thickness of a peripheral portion of the objective lens thicker at a position where an outermost light flux of the numerical aperture NA crosses.

(62) The optical pickup apparatus of (57), wherein a light source side surface of the objective lens is provided with a joint region to make a thickness of a peripheral portion of the objective lens thicker at an outside in a direction to perpendicular to an optical axis from a position where an outermost light flux of the numerical aperture NA crosses.

(63) The optical pickup apparatus of (62), wherein a stepped section is provided in a direction of an axial direction at the joint region.

(64) The optical pickup apparatus of (61), wherein an angle formed by a tangent line tangent to an aspherical surface at an inner end of the joint region and a tangent line tangent to an aspherical surface at an outer end of the joint region is 20° or less.

(65) An optical information reproducing and/or reproducing apparatus, comprising a light source to emit a light flux having a wavelength $\lambda$; and an objective lens to focus the light flux on an optical information recording medium for conducting recording or reproducing information;

the objective lens being a single lens and satisfying the following formulas:

$0.1 < f < 1$ $0.70 < NA < 0.90$ $350 \text{ nm} < \lambda < 850 \text{ nm}$ $-\frac{1}{5} < m < -\frac{1}{10}$ $0.01 < ((1-m)NA)^4 \times f \times |dn/dT|/\lambda < 0.11$ $1.2 < d/f < 1.7$ where f is a focal length for an infinite object, NA is a numerical aperture at an optical information recording medium side, $\lambda$ is a wavelength of a light flux emitted from the light source, dn/dT represents a change in a refractive index when the temperature changes 1° C., m is a magnification and d is an axial thickness; and the objective lens satisfying the following formula:

$0.0 \text{ } \lambda\text{rms} < \delta W\text{temp} + \delta W\text{height} < 0.07 \text{ } \lambda\text{rms}$ where $\delta W$temp represents an aberration of the objective lens when an ambient temperature of the optical pickup apparatus is changed from a room temperature by 30° C. and $\delta W$height represents an aberration of the objective lens at an image height Y of 0.002 mm (Y=0.002 mm).

(66) The optical information reproducing and/or reproducing apparatus of (65), wherein the objective lens comprises a diffractive structure to correct a spherical aberration to an under side at a long wavelength side and satisfies the following formula:

$$\Phi = \sum_{i=1}^{\infty} c_i h^{2i} \text{ (mm)}$$

(67) The optical information reproducing and/or reproducing apparatus of (66), wherein the following formula is satisfied:

$0.08 < ((1-m)NA)^4 \times f \times |dn/dT|/\lambda < 0.11$

(68) The optical information reproducing and/or reproducing apparatus of (65), wherein the following formula is satisfied:

$0.3 < r1/(n(1-m)f) < 0.5$ where r1 is a paraxial radius of curvature at a light source side and n is a refractive index.

(69) The optical information reproducing and/or reproducing apparatus of (65), wherein a light source side surface of the objective lens is provided with a joint region to make a thickness of a peripheral portion of the objective lens thicker at a position where an outermost light flux of the numerical aperture NA crosses.

(70) The optical information reproducing and/or reproducing apparatus of (65), wherein a light source side surface of the objective lens is provided with a joint region to make a thickness of a peripheral portion of the objective lens thicker at an outside in a direction to perpendicular to an optical axis from a position where an outermost light flux of the numerical aperture NA crosses.

(71) The optical information reproducing and/or reproducing apparatus of claim 70), wherein a stepped section is provided in a direction of an axial direction at the joint region.

(72) The optical information reproducing and/or reproducing apparatus of (69), wherein an angle formed by a tangent line tangent to an aspherical surface at an inner end of the joint region and a tangent line tangent to an aspherical surface at an outer end of the joint region is 20° or less.

In the present specification, the objective lens indicates, in the narrow meaning, a lens having the light converging action which is arranged in opposite to the optical information recording medium at the position of the most optical information recording medium side, in the condition in which the optical information recording medium is loaded into the optical pick-up apparatus, and in the broad meaning, a lens by which it can be operated by the actuator together with the lens, at least in its optical axis direction. Accordingly, in the present specification, the numerical aperture NA of the optical information recording medium side (image side) of the objective lens indicates the numerical aperture NA of the lens surface positioned on the most optical information recording medium side of the objective lens. Further, in the present specification, the necessary numerical aperture NA shows the numerical aperture regulated by the regulation of respective optical information recording medium, or the numerical aperture of the objective lens of the diffraction limit performance by which, to respective optical information recording medium, corresponding to the wavelength of the using light source, a spot diameter necessary for conducting the recording or reproducing of the information can be obtained.

DETAILED DESCRIPTION OF THE PREFERRED EMBODIMENT

Figure 1:
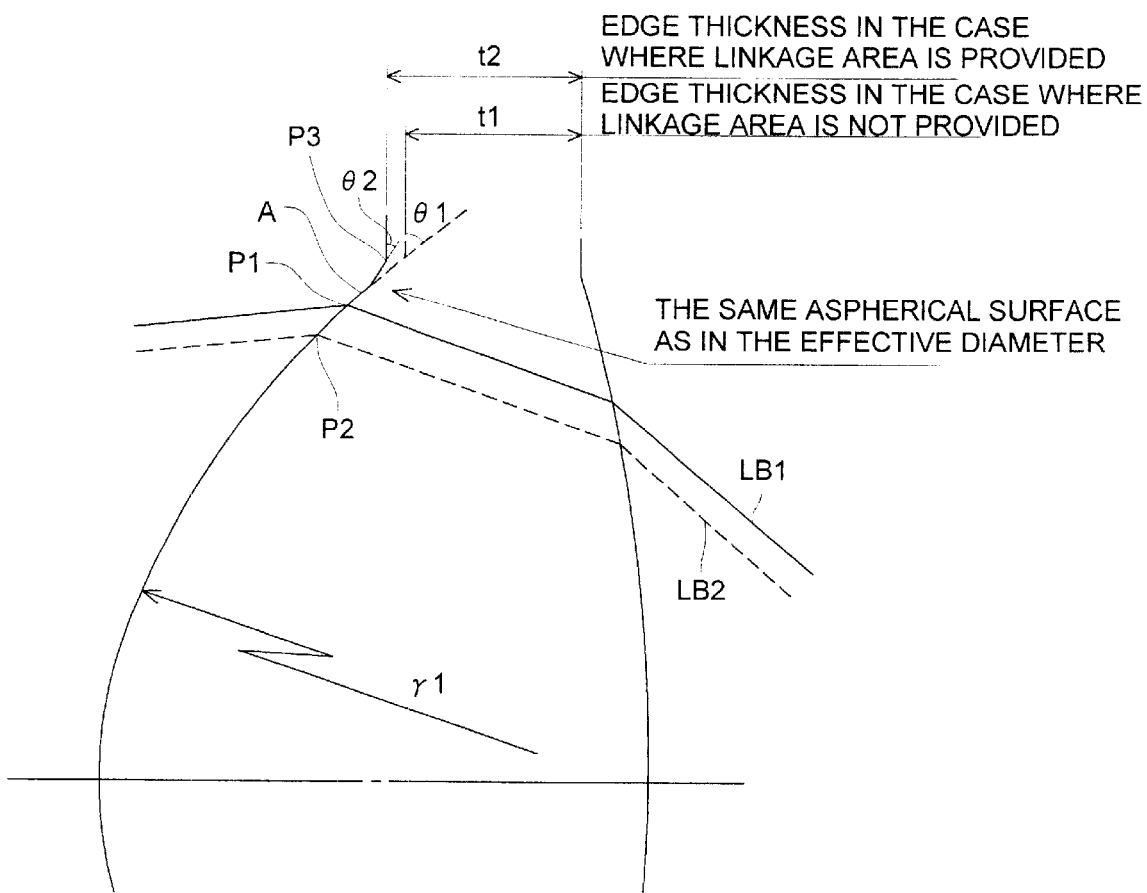
FIG. 1 is a sectional view showing a portion of an objective lens according to an example of the present invention.

Referring to the drawings, the present invention will be further detailed below.

(First Embodiment)

Figure 3:
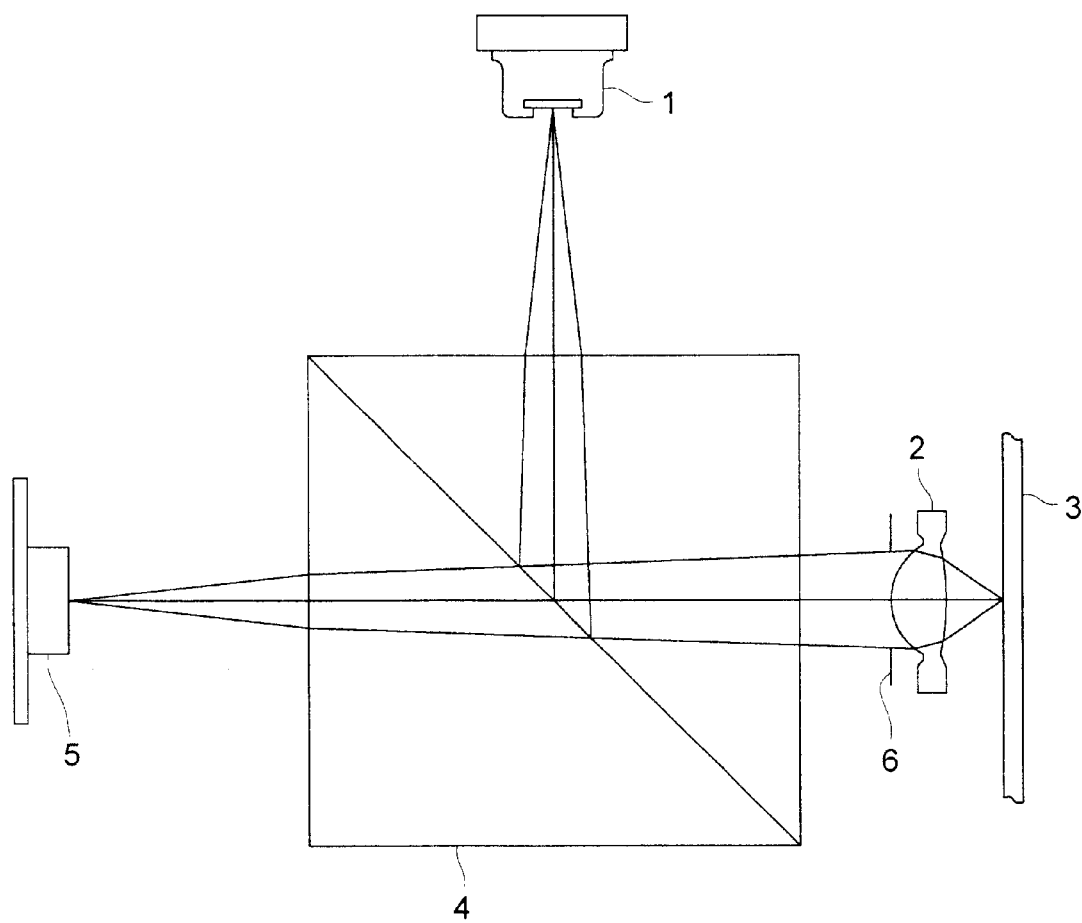
FIG. 3 is an outline structural view of an optical pick-up apparatus according to the embodiment of the present invention.

The first embodiment will be described. FIG. 3 is an outline structural view of an optical pick-up apparatus (optical information recording reproducing apparatus) including an objective lens of the present embodiment. This optical pick-up apparatus is structured by a red laser 1 as the light source of the wavelength λ, objective lens 2, and optical information recording medium 3. A beam splitter 4 exists between the red laser 1 and the objective lens 2, and the reflected light from the optical information recording medium 3 is deflected to the direction of the detector 5.

The divergent luminous flux from the red laser 1 is incident onto the objective lens 2, and its luminous flux diameter is limited by a diaphragm 6. As described above, by making the image formation magnification as definite, the number of parts of the whole optical system are small, and it can be a simple structure. The objective lens 2 is a both surface aspherical surfaces and structured by the plastic material. In the present embodiment, in order to reduce the spherical aberration deterioration due to the temperature change of the plastic made objective lens, the focal distance is decreased.

However, the focal distance f is determined by considering the balance with the image height characteristic. Herein, for the out-of axis correction, it is preferable that the axial thickness is increased. When the axial thickness is increased, the edge thickness of the objective lens 2 is increased, and even when the numerical aperture NA of the objective lens 2 is large, the possibility that the surface intersection is generated, is decreased, and it is advantageous in the optical design work. Further, when a case where the divergent luminous flux is incident on the objective lens, as compared to a case where the infinite light is incident, is advantageous also from a point of view that the working distance can be secured.

Further, it is preferable for satisfying the sinusoidal condition that the paraxial radius of curvature r1 (refer to FIG. 1) of the surface on the light source side of the objective lens 2 is within the range of $0.3 \times (n(1-m)f) < r1 < 0.5 \times (n(1-m)f)$, and more preferably, $0.36 \times (n(1-m)f) < r1 < 0.39 \times (n(1-m)f)$. When the sinusoidal condition is satisfied, the coma correction out-of axis becomes easy.

In this connection, the present invention is not limited by the above embodiment (NA, λ, m). Further, when a protective layer exists on the information recording surface as the optical information recording medium, while each item is satisfied, corresponding to the thickness of the protective layer, the spherical aberration design work of the objective lens may be conducted.

(Embodiment 2)

The embodiment 2 will be described below. In the present embodiment, the different point from the embodiment 1 is the surface shape processing out of the effective diameter of the surface on the light source side of the objective lens, and the explanation of the same structure will be neglected.

When the focal distance of the objective lens 2 is reduced, the absolute value of the paraxial radius of curvature r1

(FIG. 1) and the axial thickness are reduced. Accordingly, in the case of the same numerical aperture NA, because the lens shape is similar, the edge thickness/the axial thickness of the objective lens is almost the same, and when viewing in the absolute value, the more the focal distance f is reduced, the more the edge thickness is reduced. Although will be described in a later embodiment, when, in an objective lens of the numerical aperture NA 0.60, the axial thickness is 0.4 mm, the edge thickness is reduced lower than 0.1 mm, and even when it is the plastic material having the good fluidity, the molding property of the objective lens is deteriorated. Accordingly, in order to increase the edge thickness by even a little, in out of the effective diameter (herein, a diameter through which the outermost ray passes), the separate aspherical surface (or spherical surface) from within the effective diameter is formed. This is called a linkage area (A in FIG. 1, A' in FIG. 2).

It is possible in the molding die working that the linkage area perpendicular to the optical axis is provided directly from the outside of the effective diameter. However, when the productivity is considered, it is not preferable from the following reason. That is, normally, when the objective lens is produced by the injection molding, the gate portion is provided outside the edge. In this case, the resin is injected from the gate portion to the effective diameter inside of the objective lens, however, when the flow of the resin is considered, the unevenness is generated in the transfer property when the change of the viscous resistance is large, and the influence such as the double refraction is easily generated.

In contrast to that, when the linkage area A as shown in FIG. 1 is provided, the influence such as the double refraction is small in the molding, and the edge thickness t2 can be increased. Further, also optically, because the power of the surface is reduced outside the linkage area, the over flare is generated. In this case, even when the diaphragm is not used, the luminous flux passing in the initial numerical aperture on the optical information recording medium surface forms the light spot, and the luminous flux passing the linkage area becomes the flare, and because the contribution to the image formation is small, a desired spot shape can be attained, and the more simplification of the optical system is attained. In this connection, the present invention also is not limited to the above embodiment.

Example 1

The example 1 relates to an objective lens which can be applied to the above first embodiment. The lens data according to the objective lens of the example 1 will be shown in Table 1.

The light source is the 0-th surface, and the first and second surfaces are beam splitters, the third surface is the diaphragm, the 4-th and 5-th surfaces are objective lenses, and the 6-th surface shows the information recording surface of the optical information recording medium. In this connection, hereinafter (including the lens data of the table), the exponent of 10 (for example, $2.5 \times 10^{-3}$) is expressed by using E (for example, 2.5×E−3).

TABLE 1

Example 1

| f (mm) | 0.567 | $((1 - m) NA)^4 \times f \times |\delta n/\delta T|/\lambda$ | 0.029 |
|---|---|---|---|
| m | −0.166667 | δWtemp (λrms) at temperature change +30° C. | 0.019 |
| NA | 0.62 | δWheight (λrms) at the image height 0.02 mm | 0.028 |
| λ (nm) | 650 | d/f | 0.794 |
| δn/δT (/° C.) | −0.00012 | r1/(n(1 − m)f) | 0.370 |
| r1 | 0.3669 | | |

| The first surface | r | d | n | note |
|---|---|---|---|---|
| 0 | | 1.440 | 1.0 | light emitting point |
| 1 | ∞ | 3.5 | 1.5141 | beam splitter |
| 2 | ∞ | 0.1 | 1.0 | |
| 3 | ∞ | 0.0 | 1.0 | diaphragm (diaphragm diameter φ 0.80 mm) |
| 4 | 0.3669 | 0.45 | 1.4989 | objective lens |
| 5 | −0.7303 | 0.43 | 1.0 | |
| 6 | ∞ | | | optical information recording medium | aspherical surface data the 4-th surface aspherical surface coefficient

| κ | −0.59518 × E − 0 | | |
|---|---|---|---|
| A1 | −0.41570 × E − 0 | P1 | 4.0 |
| A2 | −0.69675 × E − 0 | P2 | 6.0 |
| A3 | −0.47751 × E + 1 | P3 | 8.0 |
| A4 | −0.40420 × E + 1 | P4 | 10.0 | the 5-th surface aspherical surface coefficient

| κ | −0.10123 × E + 2 | | |
|---|---|---|---|
| A1 | +0.98571 × E − 0 | P1 | 4.0 |
| A2 | −0.64146 × E + 1 | P2 | 6.0 |
| A3 | +0.26540 × E + 2 | P3 | 8.0 |
| A4 | −0.44010 × E + 2 | P4 | 10.0 |

The objective lens in the example 1 is structured by the both surface aspherical surfaces plastic lens, and each of aspherical surfaces has the aspherical surface shape shown by the arithmetic 1.

$$Z = \frac{h^2/r}{1 + \sqrt{1 - (1 + \kappa)(h/r)^2}} + \sum_{i=1}^{4} A_i h^{Pi} \qquad \text{[Arithmetic 1]}$$

Where Z is an axis in the optical direction, h is an axis in a perpendicular direction to the optical axis, r is the paraxial radius of curvature, κ is a conical coefficient, A is an aspherical surface coefficient, and P is an exponent of the aspherical surface.

Figure 4:
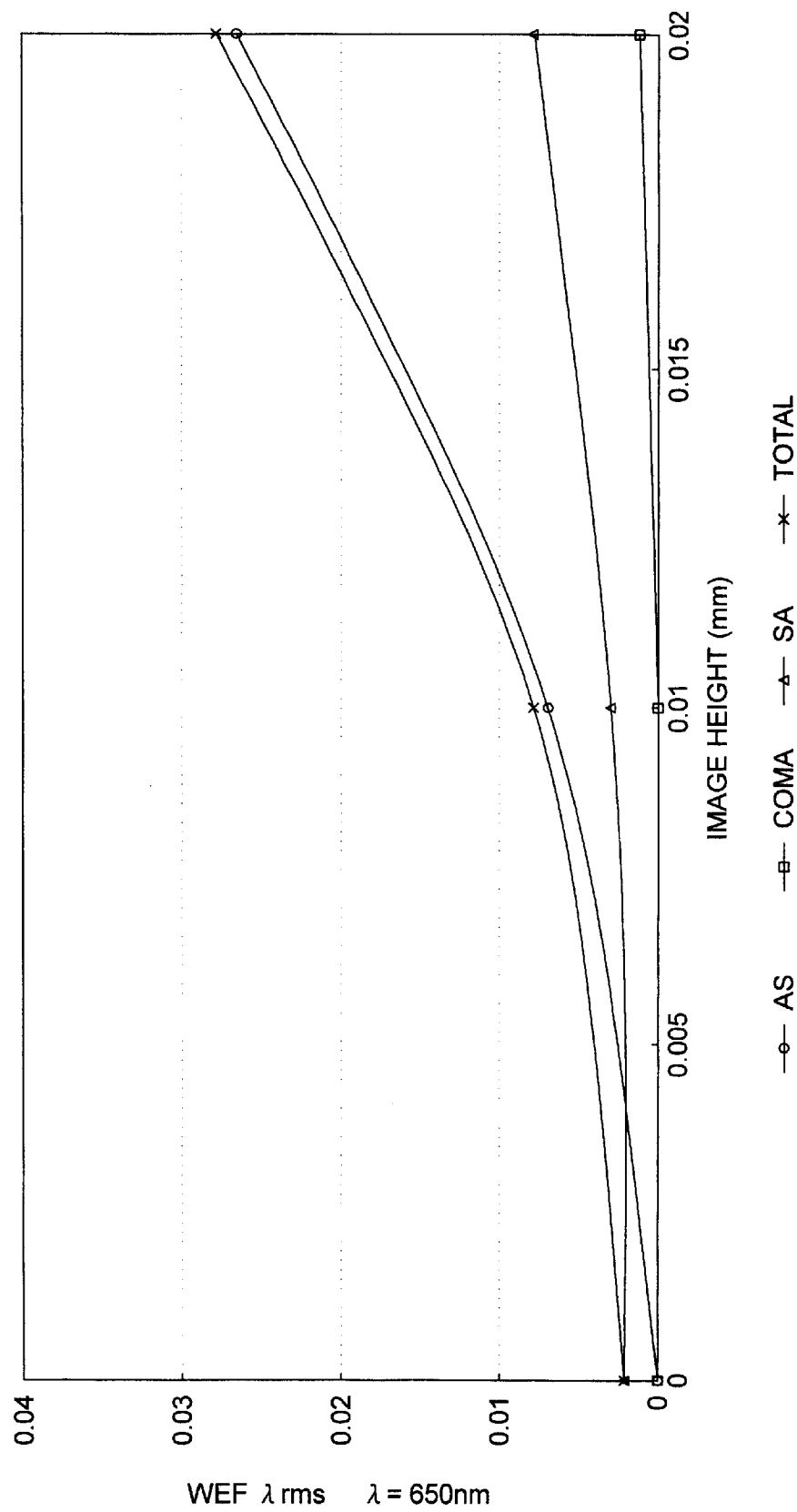
FIG. 4 is a graph showing a n image height characteristic in the objective lens of the embodiment 1.
Figure 5:
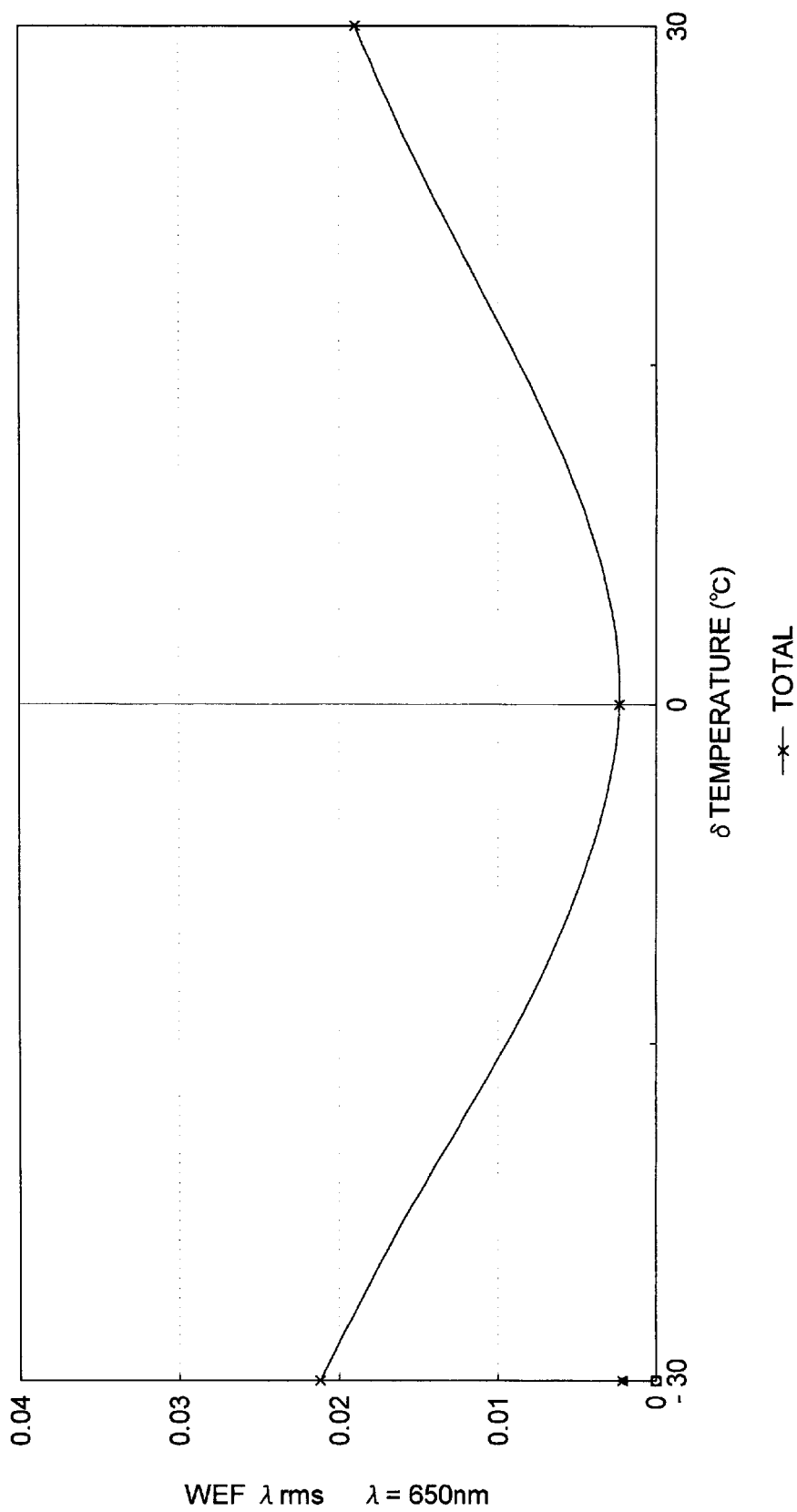
FIG. 5 is a graph showing a temperature characteristic in the objective lens of the embodiment 1.

The objective lens in the example 1 is formed of the plastic material, and the refractive index change at the time of temperature change is dn/dT=−0.00012 (/° C.). The residual amount of the spherical aberration at the time of temperature rise from the room temperature (25° C.) by 30° C. is 0.024 λrms, and the residual aberration at the image height 0.02 mm is 0.031 λrms. Th track pitch in the DVD is about 0.74 μm, and as a margin to the diffraction limit as the objective lens, it is understood that there is a margin even in the image height and temperature change. From these, even when the plastic material is used for the objective lens, it can be understood that it is an objective lens in which the temperature characteristic and image height characteristic are well balanced. FIG. 4 is a graph showing the image height in the objective lens in the example 1, and FIG. 5 is a graph showing the temperature characteristic in the objective lens in the example 1. In FIG. 4, "AS" represents an astigmatism, "COMA" represents a coma aberration, "SA" represents a spherical aberration, and "TOTAL" represents a total aberration.

Example 2

Also the example 2 relates to an objective lens which can be applied to the above embodiment 1. The difference from the example 1 is that the specification of the lens is different, and the structure as the optical pick-up apparatus is the same, and the explanation relating to the same portion is neglected.

The lens data according to the objective lens of the example 2 is shown in Table 2. The light source is the 0-th surface, and the first and second surfaces are beam splitters, and the third surface is the diaphragm and the 4-th and 5-th surfaces are the objective lens, and the 6-th surface shows the information recording surface of the optical information recording medium.

TABLE 2

Example 2

| f (mm) | 0.6 | $((1 - m) NA)^4 \times f \times |\delta n/\delta T|/\lambda$ | 0.042 |
|---|---|---|---|
| m | −0.1388889 | $\delta W temp$ ($\lambda$rms) at temperature change +30° C. | 0.037 |
| NA | 0.72 | $\delta W height$ ($\lambda$rms) at the image height 0.02 mm | 0.030 |
| $\lambda$ (nm) | 780 | d/f | 1.083 |
| $\delta n/\delta T$ (/° C.) | −0.00012 | $r1/(n(1 - m)f)$ | 0.384 |
| r1 | 0.4027 | | |

| The first surface | r | d | n | note |
|---|---|---|---|---|
| 0 | | 2.307 | 1.0 | light emitting point |
| 1 | ∞ | 3.5 | 1.5112 | beam splitter |
| 2 | ∞ | 0.1 | 1.0 | |
| 3 | ∞ | 0.0 | 1.0 | diaphragm (diaphragm diameter φ 0.949 mm) |
| 4 | 0.4027 | 0.65 | 1.535 | objective lens |
| 5 | −0.69189 | 0.346 | 1.0 | |
| 6 | ∞ | | | optical information recording medium | aspherical surface data the 4-th surface aspherical surface coefficient

κ −0.74863 × E − 0
A1 +0.11803 × E − 0    P1  4.0
A2 −0.22624 × E − 0    P2  6.0
A3 +0.37402 × E + 1    P3  8.0
A4 −0.93052 × E + 1    P4  10.0 the 5-th surface aspherical surface coefficient

κ −0.14518 × E + 2
A1 +0.11456 × E + 1    P1  4.0
A2 −0.56442 × E + 1    P2  6.0
A3 +0.13489 × E + 2    P3  8.0
A4 −0.12562 × E + 2    P4  10.0

The objective lens of the example 2 is structured by the both surface aspherical surfaces plastic lens. The numerical aperture NA is 0.72, and larger than that in the example 1, however, when the setting of the using wavelength, focal distance, magnification is optimized, the temperature characteristic can be made better than the conventional DVD objective lens of f=3 mm.

Figure 6:
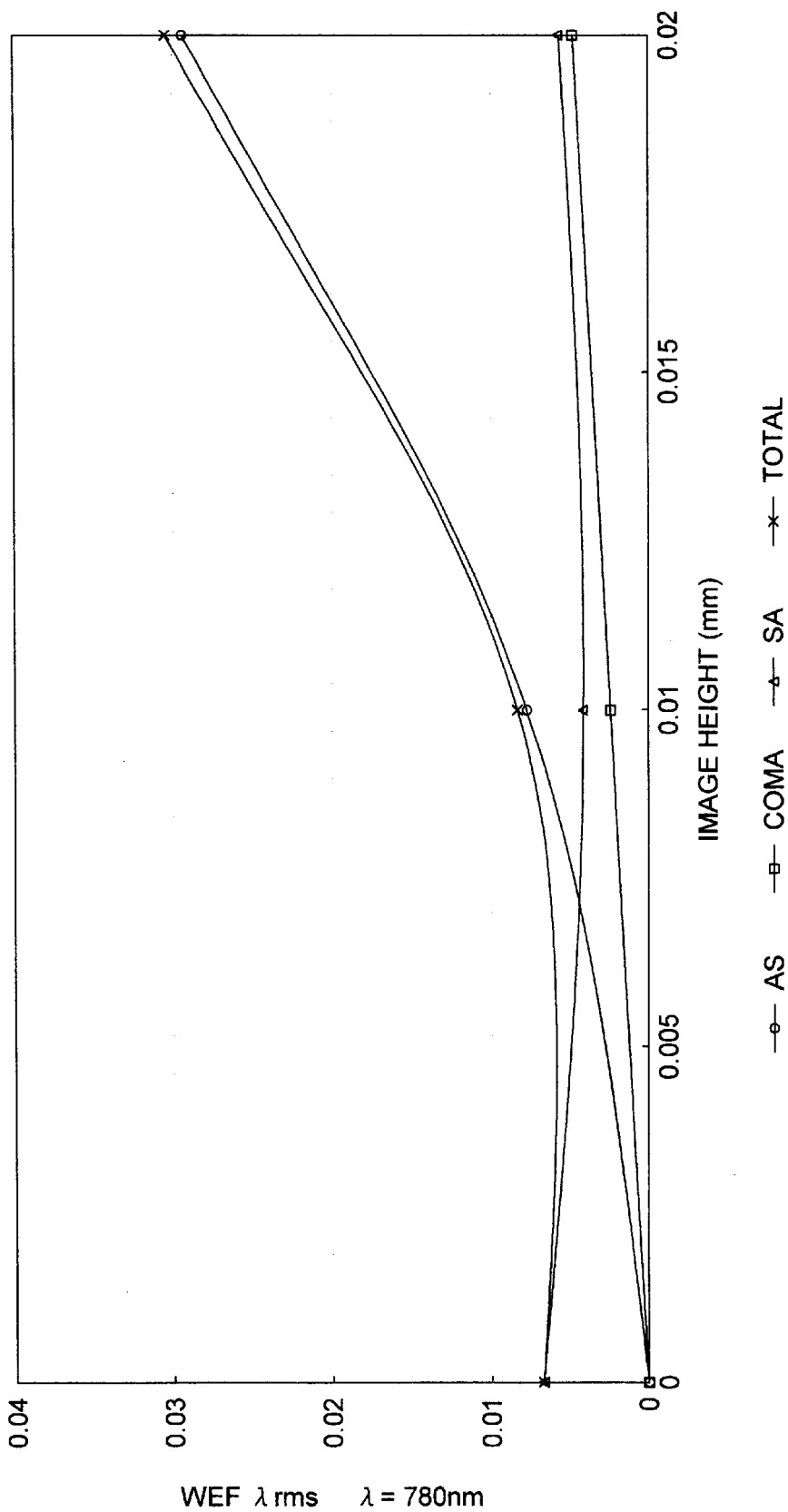
FIG. 6 is a graph showing the image height characteristic in the objective lens of the embodiment 2.
Figure 7:
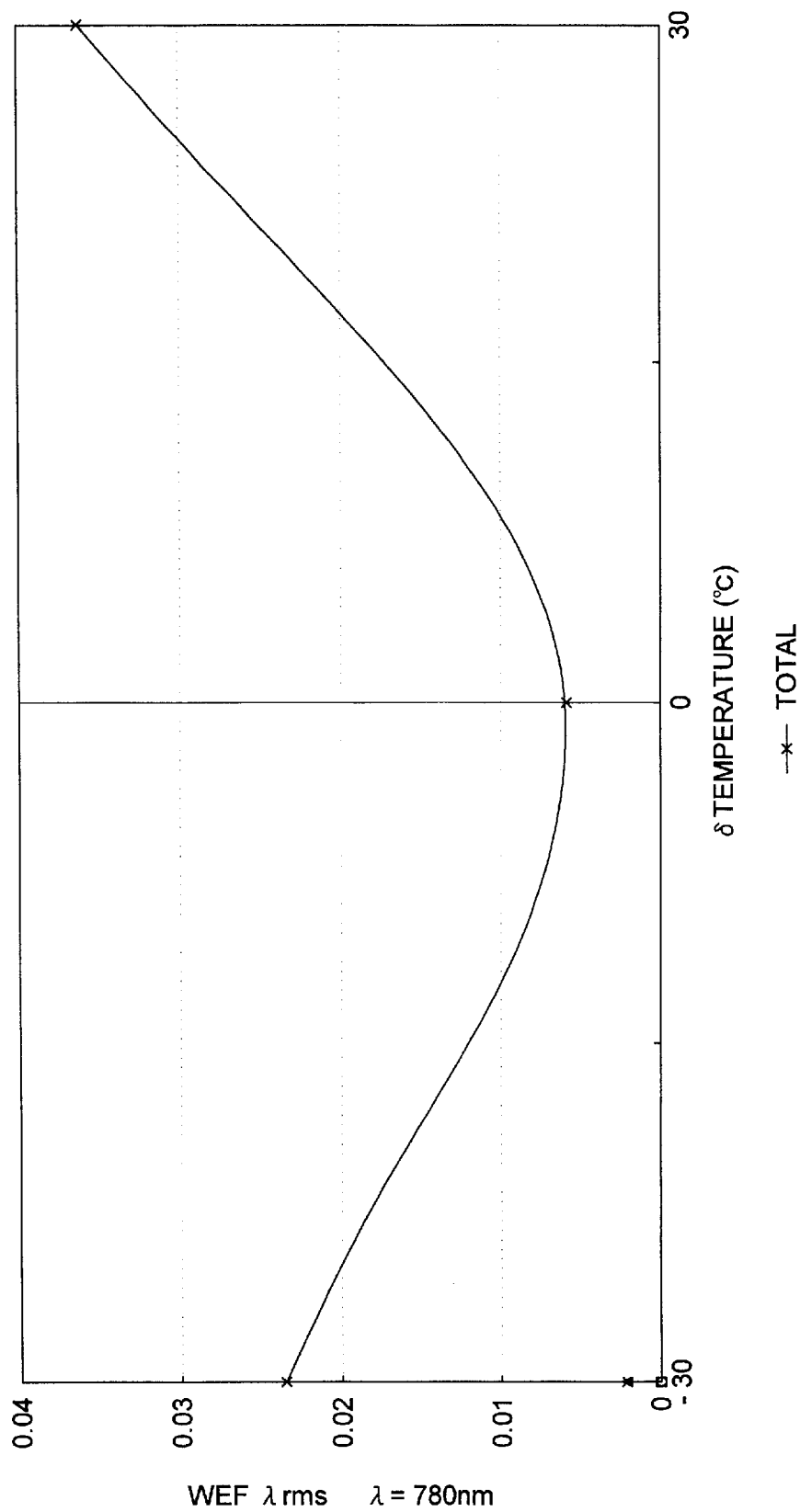
FIG. 7 is a graph showing the temperature characteristic in the objective lens of the embodiment 2.

Further, for the out-of axis correction, the paraxial radius of curvature of the first surface is determined so that it satisfies the axial thickness of the objective lens and sinusoidal condition. As shown in Table 2, as the margin to the diffraction limit as the objective lens, it is understood that there is a margin even in the image height characteristic or temperature change. From these, as the same as in the example 1, even when the plastic material is used for the objective lens, it can be understood that it is the objective lens in which the temperature characteristic and the image height characteristic are well balanced. FIG. 6 is a graph showing the imager height characteristic in the objective lens in the example 2, and FIG. 7 is a graph showing the temperature characteristic in the objective lens in the example 2. In this connection, the characteristic of FIGS. 6 and 7 can also be adapted to the objective lens in the following example 3.

Example 3

Example 3 relates to an objective lens which can be applied to the above second embodiment. In this connection, the objective lens in the example 3 is the same as the objective lens in the example 2 in the effective diameter. The lens data is shown in Table 3. The surface on the light source side of the objective lens is another aspherical surface bounded by the linkage area. The aspherical surface of the linkage area is the 4'-th surface. The outermost ray of the numerical aperture NA=0.60 passes the position of 0.5129 mm from the optical axis in the 4-th surface.

TABLE 3

Example 2

| f (mm) | 0.6 | $((1 - m) NA)^4 \times f \times |\delta n/\delta T|/\lambda$ | 0.042 |
|---|---|---|---|
| m | −0.1388889 | $\delta W temp$ ($\lambda$rms) at temperature change +30° C. | 0.026 |
| NA | 0.72 | $\delta W height$ ($\lambda$rms) at the image height 0.02 mm | 0.030 |
| $\lambda$ (nm) | 780 | d/f | 1.083 |
| $\delta n/\delta T$ (/° C.) | −0.00012 | $r1/(n(1 - m)f)$ | 0.384 |
| r1 | 0.4027 | | |
| the aspherical surface prospective angle at the effective diameter switching portion of the 4-th surface (°) | | | 59.8 |
| the aspherical surface prospective angle at the effective diameter switching portion of the 4'-th surface (°) | | | 53.3 |
| the flare light (luminous flux passing the 4'-th surface) inner diameter in the optical information recording medium (mm) | | | 0.124 |

| The first surface | r | d | n | note |
|---|---|---|---|---|
| 0 | | 2.307 | 1.0 | light emitting point |
| 1 | ∞ | 3.5 | 1.5112 | beam splitter |
| 2 | ∞ | 0.1 | 1.0 | |
| 3 | ∞ | 0.0 | 1.0 | diaphragm (diaphragm diameter φ 0.949 mm) |
| 4 | 0.4027 | 0.65 | 1.535 | in objective lens effective diameter |
| 4' | 0.4027 | (0.6075) | 1.535 | objective lens linkage portion |
| 5 | −0.69189 | 0.346 | 1.0 | |
| 6 | ∞ | | | optical information recording medium | aspherical surface data the 4-th surface in the effective diameter (in φ 1.015 mm) aspherical surface coefficient

κ −0.74863 × E − 0

TABLE 3-continued

| | | | |
|---|---|---|---|
| A1 | +0.11803 × E − 0 | P1 | 4.0 |
| A2 | −0.22624 × E − 0 | P2 | 6.0 |
| A3 | +0.37402 × E + 1 | P3 | 8.0 |
| A4 | −0.93052 × E + 1 | P4 | 10.0 | the 4'-th surface
in the effective diameter (out of φ 1.015 mm)
aspherical surface coefficient

| | | | |
|---|---|---|---|
| κ | −0.10000 × E + 1 | | |
| A1 | +0.11803 × E − 0 | P1 | 4.0 |
| A2 | −0.22624 × E − 0 | P2 | 6.0 |
| A3 | +0.37402 × E + 1 | P3 | 8.0 |
| A4 | −0.93052 × E + 1 | P4 | 10.0 | the 5-th surface aspherical surface coefficient

| | | | |
|---|---|---|---|
| κ | −0.14518 × E + 2 | | |
| A1 | +0.11456 × E + 1 | P1 | 4.0 |
| A2 | −0.56442 × E + 1 | P2 | 6.0 |
| A3 | +0.13489 × E + 2 | P3 | 8.0 |
| A4 | −0.12562 × E + 2 | P4 | 10.0 |

A case where the lens surface is provided up to the position of 0.6 mm from the optical axis will be considered. In a case where the same aspherical surface as the 4-th surface is provided between a position of 0.5129 mm from the optical axis and a position of 0.6 mm, or in the case where a linkage area such as the 4'-th surface is provided, in the latter case, the edge thickness is increased by about 0.048 mm. Although the absolute value of the increased amount is slight, because the initial edge thickness is about 0.1 mm, the increasing rate is about 50%, and as the effect, it is remarkable. In this connection, the 4'-th surface is the aspherical surface, however, also excepting this, even when it is the shape which is straight in the sectional view, the influence of the double refraction in the molding is small, and the edge thickness can be secured.

Example 4

The example 4 relates to an objective lens which is not included in the first embodiment nor the second embodiment. The optical pick-up apparatus including this objective lens has the red laser as the light source of the wavelength λ, objective lens and detector, and it is structured in such a manner that the luminous flux from the light source is converged onto the information recording surface of the optical information recording medium, and the reflected light is detected by the detector. In the divergent luminous flux emitted from the light source, its luminous flux diameter is limited by the diaphragm, and after it transmits the objective lens, it is converged onto the information recording surface of the optical information recording medium. The data of the objective lens which can be applied to such the optical pick-up apparatus is shown. The light source is the 0-th surface, and the first surface is the diaphragm, the second and the third surfaces are objective lens, and the 4-th surface shows the information recording surface of the optical information recording medium. In this connection, the objective lens in the example 4 is a glass lens of the both surface aspherical surfaces.

Example 4

| | | | |
|---|---|---|---|
| f (mm) | 0.544 | $((1 − m) NA)^4 \times f \times |\delta n/\delta T|/\lambda$ | 0.003407 |
| m | −0.1673 | δWtemp (λrms) at temperature change +30° C. | 0.0051 |
| NA | 0.85 | δWheight (λrms) at the image height 0.002 mm | 0.0036 |
| λ (nm) | 650 | d/f | 1.594669 |
| δn/δT (/° C.) | 4.20E-06 | $r1/(n(1 − m)f)$ | 0.370542 |
| r1 | 0.37186 | | |

| The i-th surface | ri | di | ni (650 nm) | note |
|---|---|---|---|---|
| 0 | | 3.2214 | 1.0 | light emitting point |
| 1 | ∞ | 0.0 | 1.0 | diaphragm (diaphragm diameter φ 0.9254 mm) |
| 2 | 0.37186 | 0.8675 | 1.580377 | objective lens BAL42 OHARA |
| 3 | −0.30062 | 0.1690 | 1.0 | |
| 4 | ∞ | | | optical information recording medium | aspherical surface data the second surface
aspherical surface coefficient

| | | | |
|---|---|---|---|
| κ | −0.69803 × E − 0 | | |
| A1 | +0.81467 × E − 1 | P1 | 4.0 |
| A2 | −0.78382 × E − 0 | P2 | 6.0 |
| A3 | +0.61264 × E + 0 | P3 | 8.0 |
| A4 | +0.11842 × E + 2 | P4 | 10.0 |
| A5 | −0.50521 × E + 2 | P5 | 12.0 | the 3-rd surface
aspherical surface coefficient

| | | | |
|---|---|---|---|
| κ | −0.15459 × E + 2 | | |
| A1 | +0.36628 × E + 1 | P1 | 4.0 |
| A2 | −0.40919 × E + 2 | P2 | 6.0 |
| A3 | +0.23401 × E + 3 | P3 | 8.0 |
| A4 | −0.56773 × E + 3 | P4 | 10.0 |
| A5 | +0.74957 × E + 2 | P5 | 12.0 |

Figure 2:
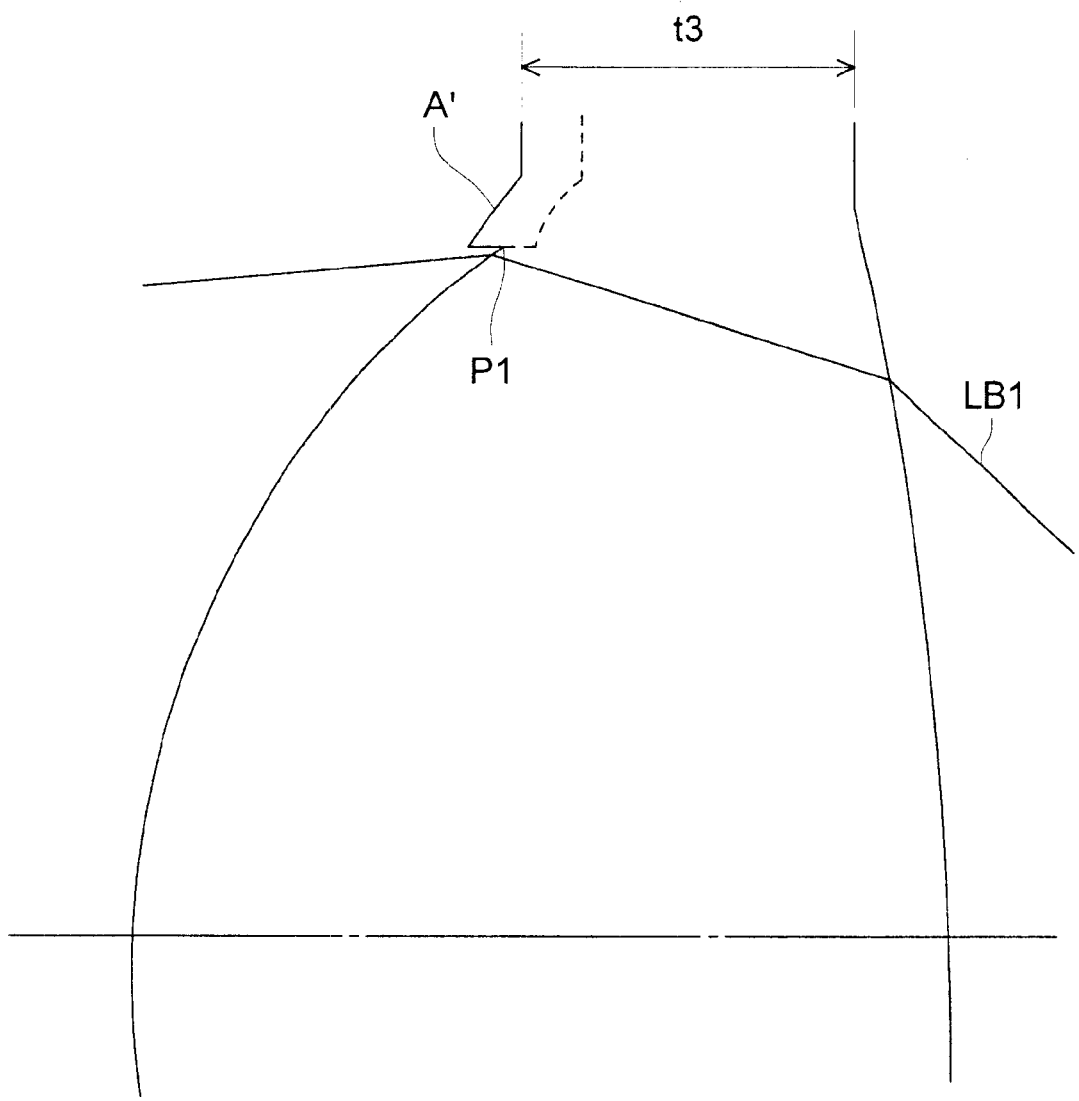
FIG. 2 is a sectional view showing a portion of an objective lens according to another example of the present invention.

In this connection, in the example 4, the objective lens is not provided with the linkage area shown in FIG. 1 or FIG. 2, but it may be provided.

Example 5

The example 5 also relates to an objective lens which is not included in the first embodiment nor the second embodiment. In the optical pick-up apparatus of the example 4, the red laser is used for the light source, but in the example 5, the blue violet laser is used. Excepting that, the structure of the optical pick-up apparatus is the same as in the example 4. The light source is the 0-th surface, and the first surface is the diaphragm, the second and the third surfaces are objective lens, and the 4-th surface shows the information recording surface of the optical information recording medium. In this connection, the objective lens in the example 5 is a glass lens of the both surface aspherical surfaces.

Example 5

| | | | |
|---|---|---|---|
| f (mm) | 0.4936 | $((1 − m) NA)^4 \times f \times |\delta n/\delta T|/\lambda$ | 0.004951 |
| m | −0.1667 | δWtemp (λrms) at temperature change +30° C. | 0.0089 |
| NA | 0.85 | δWheight (λrms) at the image height 0.002 mm | 0.0372 |
| λ (nm) | 405 | d/f | 1.316856 |
| δn/δT (/° C.) | 4.20E-06 | $r1/(n(1 − m)f)$ | 0.403423 |

-continued

| | r1 | 0.36716 | | |
|---|---|---|---|---|
| The i-th surface | ri | di | ni (405 nm) | note |
| 0 | | 3.2214 | 1.0 | light emitting point |
| 1 | ∞ | 0.0 | 1.0 | diaphragm (diaphragm diameter φ 0.9206 mm) |
| 2 | 0.36716 | 0.65 | 1.580377 | objective lens BAL42 OHARA |
| 3 | −0.51379 | 0.2483 | 1.0 | |
| 4 | ∞ | | | optical information recording medium | aspherical surface data the second surface
aspherical surface coefficient

κ −0.68600 × E − 0
A1 −0.34945 × E − 1    P1  4.0
A2 +0.16796 × E − 0    P2  6.0
A3 +0.57098 × E − 0    P3  8.0
A4 +0.18007 × E + 2    P4 10.0
A5 −0.10640 × E + 3    P5 12.0 the 3-rd surface
aspherical surface coefficient

κ −0.15106 × E + 2
A1 +0.37729 × E + 1    P1  4.0
A2 −0.35638 × E + 2    P2  6.0
A3 +0.18357 × E + 3    P3  8.0
A4 −0.52046 × E + 3    P4 10.0
A5 +0.62401 × E + 3    P5 12.0

In this connection, in the example 5, the objective lens is not provided with the linkage area shown in FIG. 1 or FIG. 2, but it may be provided.

Example 6

The example 6 also relates to an objective lens which is not included in the first embodiment nor the second embodiment. In the optical pick-up apparatus of the example 6, the aspherical plastic lens having the diffraction surface is used for the objective lens, and the other structure of the optical pick-up apparatus is the same as in the example 4. The diffraction surface in the example 6 is as follows.

On the light source side aspherical surface of the objective lens, a diffractive structure is integrated with the aspherical surface. The diffractive structure is represented with an optical path difference function with a unit of mm for a blazed wavelength (reference wavelength) λB.

$$\Phi = \sum_{i=1}^{\infty} c_i h^{2i} \text{ (mm)}$$

In the optical path difference function, h is a distance perpendicular to an optical axis and $c_i$ is a coefficient of the optical path difference function. The second order coefficient is a paraxial power of the diffractive structure. Further, a spherical aberration can be controlled with the fourth order or sixth order coefficient other than the second order coefficient. Here, the term "controllable" means that the spherical aberration of the refractive portion of the objective lens is corrected as the total spherical aberration by providing the reverse characteristic spherical aberration to the objective lens by the diffractive structure. In this case, the spherical aberration due to the temperature change can be considered as the total of the spherical aberration change of the refractive portion due to the temperature change and the spherical aberration change of the diffractive structure due to the temperature change.

The light source is the 0-th surface, and the first surface is the diaphragm, the second and the third surfaces are objective lens, and the 4-th surface shows the information recording surface of the optical information recording medium.

Example 6

| f (mm) | 0.544 | $((1-m)NA)^4 \times f \times |\delta n/\delta T|/\lambda$ | 0.097036 |
|---|---|---|---|
| m | −0.1664 | δWtemp (λrms) at temperature change +30° C. | 0.0179 |
| NA | 0.85 | δWheight (λrms) at the image height 0.002 mm | 0.0052 |
| λ (nm) | 650 | d/f | 1.556801 |
| δn/δT (/° C.) | −1.20E-04 | r1/(n(1 − m)f) | 0.410994 |
| r1 | 0.40190 | | |

| The i-th surface | ri | di | ni (650 nm) | note |
|---|---|---|---|---|
| 0 | | 3.2214 | 1.0 | light emitting point |
| 1 | ∞ | 0.0 | 1.0 | diaphragm (diaphragm diameter φ 0.9220 mm) |
| 2 | 0.40190 | 0.8469 | 1.54112 | objective lens plastic |
| 3 | −0.27240 | 0.1469 | 1.0 | |
| 4 | ∞ | | | optical information recording medium | aspherical surface data the second surface
optical path difference function
(coefficient of the optical path difference function:
reference wavelength 650 nm, the diffraction number of order first order)

C2 −1.4284 × E − 1
C4 −3.2568 × E − 1
C6 −1.8831 × E − 1
C8 +1.2607 × E − 0 aspherical surface coefficient

κ −0.69803 × E − 0
A1 +0.81467 × E − 1    P1  4.0
A2 −0.78382 × E − 0    P2  6.0
A3 +0.61264 × E − 0    P3  8.0
A4 +0.11842 × E + 2    P4 10.0
A5 −0.50521 × E + 2    P5 12.0 the 3-rd surface
aspherical surface coefficient

κ −0.15459 × E + 2
A1 +0.36628 × E + 1    P1  4.0
A2 −0.40919 × E + 2    P2  6.0
A3 +0.23401 × E + 3    P3  8.0
A4 −0.56773 × E + 3    P4 10.0
A5 +0.74957 × E + 2    P5 12.0

In this connection, in the example 6, the objective lens is not provided with the linkage area shown in FIG. 1 or FIG. 2, but it may be provided.

The above Examples 4 and 5 corresponds to the structures (31) in which the objective lens is made of a glass and has an aspheric surface. The above Example 6 corresponds to the structure (49) in which the objective lens is made of a plastic and has a diffractive surface.

When the value of the term ((1−m) - - - ) in the structures (31) and (49) is small, an usual aspheric objective lens keeps a temperature characteristic. However, when the value of the term ((1−m) - - -) is large, the diffractive structure as shown in Example 6 is necessary to cancel the influence of the temperature. In Example 6, the diffractive structure is formed on the aspheric surface of the objective lens.

Further, when the NA of the objective lens is large (high), if "d/f" is relatively small, the thickness of the periphery section becomes almost zero. Therefore, when the NA is large, it is necessary to make "d/f" relatively large.

According to the present invention, also in the optical pick-up apparatus in which the numerical aperture NA is increased, and the wavelength of the light source is shortened, an objective lens which is formed of a plastic single lens with the excellent temperature characteristic and by which the whole optical system well balanced with the image height characteristic, can be made compact, and the optical pick-up apparatus using the objective lens, and the optical information recording reproducing apparatus, can be provided. Further, according to the present invention, an objective lens having the small diameter in which the edge thickness is increased and the productivity is increased, and the optical pick-up apparatus using the objective lens, and the optical information recording reproducing apparatus, can be provided.

What is claimed is:

1. An objective lens for use in an optical pickup apparatus which comprises a light source to emit a light flux having a wavelength λ and the objective lens to focus the light flux on an optical information recording medium for conducting recording or reproducing information, comprising:

the objective lens being a single lens and satisfying the following formulas:

$0.1 < f < 1$ $0.50 < NA < 0.90$ $350\ nm < \lambda < 850\ nm$ $1/10 < |m| < 1/3$ $0.0 < ((1-m)NA)^4 \times f \times |dn/dT|/\lambda < 0.2$ where f is a focal length for an infinite object, NA is a numerical aperture at an optical information recording medium side, λ is a wavelength of a light flux emitted from the light source, dn/dT represents a change in a refractive index when the temperature changes 1° C., and m is a magnification; and the objective lens satisfying the following formula:

$0.0\ \lambda rms < \delta Wtemp + \delta Wheight < 0.07\ \lambda rms$ where δWtemp represents an aberration of the objective lens when an ambient temperature of the optical pickup apparatus is changed from a room temperature by 30° C. and δWheight represents an aberration of the objective lens at an image height Y of 0.02 mm (Y=0.02 mm).

2. The objective lens of claim 1, wherein the objective lens is made of a plastic material.

3. The objective lens of claim 1, wherein each of both surfaces of the objective lens is an aspherical surface.

4. The objective lens of claim 1, wherein the following formulas are satisfied:

$0.50 < NA < 0.75$ $450\ nm < \lambda < 850\ nm$ $0.0 < ((1-m)NA)^4 \times f \times |dn/dT|/\lambda < 0.06.$ 5. The objective lens of claim 1, wherein the following formula is satisfied:

$0.4 < d/f < 1.5$ where d is an axial thickness of the objective lens.

6. The objective lens of claim 1, wherein the following formula is satisfied:

$0.3 < r1/(n(1-m)f) < 0.5$ where r1 is a paraxial radius of curvature at a light source side and n is a refractive index.

7. The objective lens of claim 1, wherein a light source side surface of the objective lens is provided with a joint region to make a thickness of a peripheral portion of the objective lens thicker at a position where an outermost light flux of the numerical aperture NA crosses.

8. The objective lens of claim 7, wherein an angle formed by a tangent line tangent to an aspherical surface at an inner end of the joint region and a tangent line tangent to an aspherical surface at an outer end of the joint region is 20° or less.

9. The objective lens of claim 1, wherein a light source side surface of the objective lens is provided with a joint region to make a thickness of a peripheral portion of the objective lens thicker at an outside in a direction to perpendicular to an optical axis from a position where an outermost light flux of the numerical aperture NA crosses.

10. The objective lens of claim 9, wherein a stepped section is provided in a direction of an axial direction at the joint region.

11. An optical pickup apparatus, comprising:

a light source to emit a light flux having a wavelength λ; and an objective lens to focus the light flux on an optical information recording medium for conducting recording or reproducing information;

the objective lens being a single lens and satisfying the following formulas:

$0.1 < f < 1$ $0.50 < NA < 0.90$ $350\ nm < \lambda < 850\ nm$ $1/10 < |m| < 1/3$ $0.0 < ((1-m)NA)^4 \times f \times |dn/dT|/\lambda < 0.2$ where f is a focal length for an infinite object, NA is a numerical aperture at an optical information recording medium side, λ is a wavelength of a light flux emitted from the light source, dn/dT represents a change in a refractive index when the temperature changes 1° C., and m is a magnification; and the objective lens satisfying the following formula:

$0.0\ \lambda rms < \delta Wtemp + \delta Wheight < 0.07\ \lambda rms$ where δWtemp represents an aberration of the objective lens when an ambient temperature of the optical pickup apparatus is changed from a room temperature by 30° C. and δWheight represents an aberration of the objective lens at an image height Y of 0.02 mm (Y=0.02 mm).

12. The optical pickup apparatus of claim 11, wherein the objective lens is made of a plastic material.

13. The optical pickup apparatus of claim 11, wherein each of both surfaces of the objective lens is an aspherical surface.

14. The optical pickup apparatus of claim 11, wherein the following formulas are satisfied:

$$0.50 < NA < 0.75$$

$$450 \text{ nm} < \lambda < 850 \text{ nm}$$

$$0.0 < ((1-m)NA)^4 \times f \times |dn/dT|/\lambda < 0.06.$$

15. The optical pickup apparatus of claim 11, wherein the following formula is satisfied:

$$0.4 < d/f < 1.5$$

where d is an axial thickness d of the objective lens.

16. The optical pickup apparatus of claim 11, wherein the following formula is satisfied:

$$0.3 < r1/(n(1-m)f) < 0.5$$

where r1 is a paraxial radius of curvature at a light source side and n is a refractive index.

17. The optical pickup apparatus of claim 11, wherein a light source side surface of the objective lens is provided with a joint region to make a thickness of a peripheral portion of the objective lens thicker at a position where an outermost light flux of the numerical aperture NA crosses.

18. The optical pickup apparatus 17, wherein an angle formed by a tangent line tangent to an aspherical surface at an inner end of the joint region and a tangent line tangent to an aspherical surface at an outer end of the joint region is 20° or less.

19. The optical pickup apparatus of claim 11, wherein a light source side surface of the objective lens is provided with a joint region to make a thickness of a peripheral portion of the objective lens thicker at an outside in a direction to perpendicular to an optical axis from a position where an outermost light flux of the numerical aperture NA crosses.

20. The optical pickup apparatus of claim 19, wherein a stepped section is provided in a direction of an axial direction at the joint region.

21. An optical information reproducing and/or reproducing apparatus, comprising:

a light source to emit a light flux having a wavelength $\lambda$; and an objective lens to focus the light flux on an optical information recording medium for conducting recording or reproducing information;

the objective lens being a single lens and satisfying the following formulas:

$$0.1 < f < 1$$

$$0.50 < NA < 0.90$$

$$350 \text{ nm} < \lambda < 850 \text{ nm}$$

$$1/10 < |m| < 1/3$$

$$0.0 < ((1-m)NA)^4 \times f \times |dn/dT|/\lambda < 0.2$$

where f is a focal length for an infinite object, NA is a numerical aperture at an optical information recording medium side, $\lambda$ is a wavelength of a light flux emitted from the light source, dn/dT represents a change in a refractive index when the temperature changes 1° C., and m is a magnification; and the objective lens satisfying the following formula:

$$0.0 \; \lambda \text{rms} < \delta W\text{temp} + \delta W\text{height} < 0.07 \; \lambda \text{rms}$$

where $\delta W\text{temp}$ represents an aberration of the objective lens when an ambient temperature of the optical pickup apparatus is changed from a room temperature by 30° C. and $\delta W\text{height}$ represents an aberration of the objective lens at an image height Y of 0.02 mm (Y=0.02 mm).

22. The optical information reproducing and/or reproducing apparatus of claim 21, wherein the objective lens is made of a plastic material.

23. The optical information reproducing and/or reproducing apparatus of claim 21, wherein each of both surfaces of the objective lens is an aspherical surface.

24. The optical information reproducing and/or reproducing apparatus of claim 21, wherein the following formulas are satisfied:

$$0.50 < NA < 0.75$$

$$450 \text{ nm} < \lambda < 850 \text{ nm}$$

$$0.0 < ((1-m)NA)^4 \times f \times |dn/dT|/\lambda < 0.06.$$

25. The optical information reproducing and/or reproducing apparatus of claim 21, wherein the following formula is satisfied:

$$0.4 < d/f < 1.5$$

where d is an axial thickness d of the objective lens.

26. The optical information reproducing and/or reproducing apparatus of claim 21, wherein the following formula is satisfied:

$$0.3 < r1/(n(1-m)f) < 0.5$$

where r1 is a paraxial radius of curvature at a light source side and n is a refractive index.

27. The optical information reproducing and/or reproducing apparatus of claim 21, wherein a light source side surface of the objective lens is provided with a joint region to make a thickness of a peripheral portion of the objective lens thicker at a position where an outermost light flux of the numerical aperture NA crosses.

28. The optical information reproducing and/or reproducing apparatus 27, wherein an angle formed by a tangent line tangent to an aspherical surface at an inner end of the joint region and a tangent line tangent to an aspherical surface at an outer end of the joint region is 20° or less.

29. The optical information reproducing and/or reproducing apparatus of claim 21, wherein a light source side surface of the objective lens is provided with a joint region to make a thickness of a peripheral portion of the objective lens thicker at an outside in a direction to perpendicular to an optical axis from a position where an outermost light flux of the numerical aperture NA crosses.

30. The optical information reproducing and/or reproducing apparatus of claim 29, wherein a stepped section is provided in a direction of an axial direction at the joint region.

31. An objective lens for use in an optical pickup apparatus which comprises a light source to emit a light flux having a wavelength $\lambda$ and the objective lens to focus the light flux on an optical information recording medium for conducting recording or reproducing information, comprising:

the objective lens being a single lens and satisfying the following formulas:

$0.1 < f < 1$ $0.70 < NA < 0.90$ $350 \text{ nm} < \lambda < 850 \text{ nm}$ $-1/5 < m < -1/10$ $0.0 < ((1-m)NA)^4 \times f \times |dn/dT|/\lambda < 0.01$ $1.2 < d/f < 1.7$ where f is a focal length for an infinite object, NA is a numerical aperture at an optical information recording medium side, λ is a wavelength of a light flux emitted from the light source, dn/dT represents a change in a refractive index when the temperature changes 1° C., m is a magnification and d is an axial thickness; and the objective lens satisfying the following formula:

$0.0 \text{ λrms} < \delta Wtemp + \delta Wheight < 0.07 \text{ λrms}$ where δWtemp represents an aberration of the objective lens when an ambient temperature of the optical pickup apparatus is changed from a room temperature by 30° C. and δWheight represents an aberration of the objective lens at an image height Y of 0.002 mm (Y=0.002 mm).

32. The objective lens of claim 31, wherein the following formula is satisfied:

$0.3 < r1/(n(1-m)f) < 0.5$ where r1 is a paraxial radius of curvature at a light source side and n is a refractive index.

33. The objective lens of claim 31, wherein a light source side surface of the objective lens is provided with a joint region to make a thickness of a peripheral portion of the objective lens thicker at a position where an outermost light flux of the numerical aperture NA crosses.

34. The objective lens of claim 33, wherein an angle formed by a tangent line tangent to an aspherical surface at an inner end of the joint region and a tangent line tangent to an aspherical surface at an outer end of the joint region is 20° or less.

35. The objective lens of claim 31, wherein a light source side surface of the objective lens is provided with a joint region to make a thickness of a peripheral portion of the objective lens thicker at an outside in a direction to perpendicular to an optical axis from a position where an outermost light flux of the numerical aperture NA crosses.

36. The objective lens of claim 35, wherein a stepped section is provided in a direction of an axial direction at the joint region.

37. An optical pickup apparatus, comprising:

a light source to emit a light flux having a wavelength λ; and an objective lens to focus the light flux on an optical information recording medium for conducting recording or reproducing information;

the objective lens being a single lens and satisfying the following formulas:

$0.1 < f < 1$ $0.70 < NA < 0.90$ $350 \text{ nm} < \lambda < 850 \text{ nm}$ $-1/5 < m < -1/10$ $0.0 < ((1-m)NA)^4 \times f \times |dn/dT|/\lambda < 0.01$ $1.2 < d/f < 1.7$ where f is a focal length for an infinite object, NA is a numerical aperture at an optical information recording medium side, λ is a wavelength of a light flux emitted from the light source, dn/dT represents a change in a refractive index when the temperature changes 1° C., m is a magnification and d is an axial thickness; and the objective lens satisfying the following formula:

$0.0 \text{ λrms} < \delta Wtemp + \delta Wheight < 0.07 \text{ λrms}$ where δWtemp represents an aberration of the objective lens when an ambient temperature of the optical pickup apparatus is changed from a room temperature by 30° C. and δWheight represents an aberration of the objective lens at an image height Y of 0.002 mm (Y=0.002 mm).

38. The optical pickup apparatus of claim 37, wherein the following formula is satisfied:

$0.3 < r1/(n(1-m)f) < 0.5$ where r1 is a paraxial radius of curvature at a light source side and n is a refractive index.

39. The optical pickup apparatus of claim 37, wherein a light source side surface of the objective lens is provided with a joint region to make a thickness of a peripheral portion of the objective lens thicker at a position where an outermost light flux of the numerical aperture NA crosses.

40. The optical pickup apparatus of claim 39, wherein an angle formed by a tangent line tangent to an aspherical surface at an inner end of the joint region and a tangent line tangent to an aspherical surface at an outer end of the joint region is 20° or less.

41. The optical pickup apparatus of claim 37, wherein a light source side surface of the objective lens is provided with a joint region to make a thickness of a peripheral portion of the objective lens thicker at an outside in a direction to perpendicular to an optical axis from a position where an outermost light flux of the numerical aperture NA crosses.

42. The optical pickup apparatus of claim 41, wherein a stepped section is provided in a direction of an axial direction at the joint region.

43. An optical information reproducing and/or reproducing apparatus, comprising:

a light source to emit a light flux having a wavelength λ; and an objective lens to focus the light flux on an optical information recording medium for conducting recording or reproducing information;

the objective lens being a single lens and satisfying the following formulas:

$0.1 < f < 1$ $0.70 < NA < 0.90$ $350 \text{ nm} < \lambda < 850 \text{ nm}$ $-1/5 < m < -1/10$ $0.0 < ((1-m)NA)^4 \times f \times |dn/dT|/\lambda < 0.01$ $1.2 < d/f < 1.7$ where f is a focal length for an infinite object, NA is a numerical aperture at an optical information recording medium side, $\lambda$ is a wavelength of a light flux emitted from the light source, dn/dT represents a change in a refractive index when the temperature changes 1° C., m is a magnification and d is an axial thickness; and the objective lens satisfying the following formula:

$0.0\ \lambda rms < \delta Wtemp + \delta Wheight < 0.07\ \lambda rms$ where $\delta Wtemp$ represents an aberration of the objective lens when an ambient temperature of the optical pickup apparatus is changed from a room temperature by 30° C. and $\delta Wheight$ represents an aberration of the objective lens at an image height Y of 0.002 mm (Y=0.002 mm).

44. The optical information reproducing and/or reproducing apparatus of claim 43, wherein the following formula is satisfied:

$0.3 < r1/(n(1-m)f) < 0.5$ where r1 is a paraxial radius of curvature at a light source side and n is a refractive index.

45. The optical information reproducing and/or reproducing apparatus of claim 43, wherein a light source side surface of the objective lens is provided with a joint region to make a thickness of a peripheral portion of the objective lens thicker at a position where an outermost light flux of the numerical aperture NA crosses.

46. The optical information reproducing and/or reproducing apparatus of claim 45, wherein an angle formed by a tangent line tangent to an aspherical surface at an inner end of the joint region and a tangent line tangent to an aspherical surface at an outer end of the joint region is 20° or less.

47. The optical information reproducing and/or reproducing apparatus of claim 43, wherein a light source side surface of the objective lens is provided with a joint region to make a thickness of a peripheral portion of the objective lens thicker at an outside in a direction to perpendicular to an optical axis from a position where an outermost light flux of the numerical aperture NA crosses.

48. The optical information reproducing and/or reproducing apparatus of claim 47, wherein a stepped section is provided in a direction of an axial direction at the joint region.

49. An objective lens for use in an optical pickup apparatus which comprises a light source to emit a light flux having a wavelength $\lambda$ and the objective lens to focus the light flux on an optical information recording medium for conducting recording or reproducing information, comprising:

the objective lens being a single lens and satisfying the following formulas:

$0.1 < f < 1$ $0.70 < NA < 0.90$ $350\ nm < \lambda < 850\ nm$ $-1/5 < m < -1/10$ $0.01 < ((1-m)NA)^4 \times f \times |dn/dT|/\lambda < 0.11$ $1.2 < d/f < 1.7$ where f is a focal length for an infinite object, NA is a numerical aperture at an optical information recording medium side, $\lambda$ is a wavelength of a light flux emitted from the light source, dn/dT represents a change in a refractive index when the temperature changes 1° C., m is a magnification and d is an axial thickness; and the objective lens satisfying the following formula:

$0.0\ \lambda rms < \delta Wtemp + \delta Wheight < 0.07\ \lambda rms$ where $\delta Wtemp$ represents an aberration of the objective lens when an ambient temperature of the optical pickup apparatus is changed from a room temperature by 30° C. and $\delta Wheight$ represents an aberration of the objective lens at an image height Y of 0.002 mm (Y=0.002 mm).

50. The objective lens of claim 49, wherein the objective lens comprises a diffractive structure to correct a spherical aberration to an under side at a long wavelength side and satisfies the following formula:

$$\Phi = \sum_{i=1}^{\infty} c_i h^{2i}\ (mm).$$

51. The objective lens of claim 50, wherein the following formula is satisfied:

$0.08 < ((1-m)NA)^4 \times f \times |dn/dT|/\lambda < 0.11.$

52. The objective lens of claim 49, wherein the following formula is satisfied:

$0.3 < r1/(n(1-m)f) < 0.5$ where r1 is a paraxial radius of curvature at a light source side and n is a refractive index.

53. The objective lens of claim 49, wherein a light source side surface of the objective lens is provided with a joint region to make a thickness of a peripheral portion of the objective lens thicker at a position where an outermost light flux of the numerical aperture NA crosses.

54. The objective lens of claim 53, wherein an angle formed by a tangent line tangent to an aspherical surface at an inner end of the joint region and a tangent line tangent to an aspherical surface at an outer end of the joint region is 20° or less.

55. The objective lens of claim 49, wherein a light source side surface of the objective lens is provided with a joint region to make a thickness of a peripheral portion of the objective lens thicker at an outside in a direction to perpendicular to an optical axis from a position where an outermost light flux of the numerical aperture NA crosses.

56. The objective lens of claim 55, wherein a stepped section is provided in a direction of an axial direction at the joint region.

57. An optical pickup apparatus, comprising:

a light source to emit a light flux having a wavelength $\lambda$; and an objective lens to focus the light flux on an optical information recording medium for conducting recording or reproducing information;

the objective lens being a single lens and satisfying the following formulas:

$0.1 < f < 1$ $0.70 < NA < 0.90$ 350 nm<λ<850 nm

−1/5<m<−1/10

0.01<((1−m)NA)$^4$×f×|dn/dT|/λ<0.11

1.2<d/f<1.7 where f is a focal length for an infinite object, NA is a numerical aperture at an optical information recording medium side, λ is a wavelength of a light flux emitted from the light source, dn/dT represents a change in a refractive index when the temperature changes 1° C., m is a magnification and d is an axial thickness; and the objective lens satisfying the following formula:

0.0 λrms<δWtemp+δWheight<0.07 λrms where δWtemp represents an aberration of the objective lens when an ambient temperature of the optical pickup apparatus is changed from a room temperature by 30° C. and δWheight represents an aberration of the objective lens at an image height Y of 0.002 mm (Y=0.002 mm).

58. The optical pickup apparatus of claim 57, wherein the objective lens comprises a diffractive structure to correct a spherical aberration to an under side at a long wavelength side and satisfies the following formula:

$$\Phi = \sum_{i=1}^{\infty} c_i h^{2i} \text{ (mm)}.$$

59. The optical pickup apparatus of claim 58, wherein the following formula is satisfied:

0.08<((1−m)NA)$^4$×f×|dn/dT|/λ<0.11.

60. The optical pickup apparatus of claim 57, wherein the following formula is satisfied:

0.3<r1/(n(1−m)f)<0.5 where r1 is a paraxial radius of curvature at a light source side and n is a refractive index.

61. The optical pickup apparatus of claim 57, wherein a light source side surface of the objective lens is provided with a joint region to make a thickness of a peripheral portion of the objective lens thicker at a position where an outermost light flux of the numerical aperture NA crosses.

62. The optical pickup apparatus of claim 61, wherein an angle formed by a tangent line tangent to an aspherical surface at an inner end of the joint region and a tangent line tangent to an aspherical surface at an outer end of the joint region is 20° or less.

63. The optical pickup apparatus of claim 57, wherein a light source side surface of the objective lens is provided with a joint region to make a thickness of a peripheral portion of the objective lens thicker at an outside in a direction to perpendicular to an optical axis from a position where an outermost light flux of the numerical aperture NA crosses.

64. The optical pickup apparatus of claim 63, wherein a stepped section is provided in a direction of an axial direction at the joint region.

65. An optical information reproducing and/or reproducing apparatus, comprising a light source to emit a light flux having a wavelength λ; and an objective lens to focus the light flux on an optical information recording medium for conducting recording or reproducing information;

the objective lens being a single lens and satisfying the following formulas:

0.1<f<1

0.70<NA<0.90

350 nm<λ<850 nm

−1/5<m<−1/10

0.01<((1−m)NA)$^4$×f×|dn/dT|/λ<0.11

1.2<d/f<1.7 where f is a focal length for an infinite object, NA is a numerical aperture at an optical information recording medium side, λ is a wavelength of a light flux emitted from the light source, dn/dT represents a change in a refractive index when the temperature changes 1° C., m is a magnification and d is an axial thickness; and the objective lens satisfying the following formula:

0.0 λrms<δWtemp+δWheight<0.07 λrms where δWtemp represents an aberration of the objective lens when an ambient temperature of the optical pickup apparatus is changed from a room temperature by 30° C. and δWheight represents an aberration of the objective lens at an image height Y of 0.002 mm (Y=0.002 mm).

66. The optical information reproducing and/or reproducing apparatus of claim 65, wherein the objective lens comprises a diffractive structure to correct a spherical aberration to an under side at a long wavelength side and satisfies the following formula:

$$\Phi = \sum_{i=1}^{\infty} c_i h^{2i} \text{ (mm)}.$$

67. The optical information reproducing and/or reproducing apparatus of claim 66, wherein the following formula is satisfied:

0.08≤((1−m)NA)$^4$×f×|dn/dT|/λ<0.11.

68. The optical information reproducing and/or reproducing apparatus of claim 65, wherein the following formula is satisfied:

0.3<r1/(n(1−m)f)<0.5 where r1 is a paraxial radius of curvature at a light source side and n is a refractive index.

69. The optical information reproducing and/or reproducing apparatus of claim 65, wherein a light source side surface of the objective lens is provided with a joint region to make a thickness of a peripheral portion of the objective lens thicker at a position where an outermost light flux of the numerical aperture NA crosses.

70. The optical information reproducing and/or reproducing apparatus of claim 69, wherein an angle formed by a tangent line tangent to an aspherical surface at an inner end of the joint region and a tangent line tangent to an aspherical surface at an outer end of the joint region is 20° or less.

71. The optical information reproducing and/or reproducing apparatus of claim 65, wherein a light source side surface of the objective lens is provided with a joint region to make a thickness of a peripheral portion of the objective lens thicker at an outside in a direction to perpendicular to an optical axis from a position where an outermost light flux of the numerical aperture NA crosses.

72. The optical information reproducing and/or reproducing apparatus of claim 71, wherein a stepped section is provided in a direction of an axial direction at the joint region.

* * * * *